(12) United States Patent
Liu

(10) Patent No.: US 8,616,779 B2
(45) Date of Patent: Dec. 31, 2013

(54) SHORTENED DRIVESHAFT STEM

(75) Inventor: David S. Liu, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 376 days.

(21) Appl. No.: 12/955,029

(22) Filed: Nov. 29, 2010

(65) Prior Publication Data
US 2012/0133198 A1 May 31, 2012

(51) Int. Cl.
*F16C 13/00* (2006.01)

(52) U.S. Cl.
USPC ....................................................... 384/544

(58) Field of Classification Search
USPC ........ 384/544, 589; 464/178; 301/105.1, 109, 301/110
See application file for complete search history.

(56) References Cited

U.S. PATENT DOCUMENTS

| | | | |
|---|---|---|---|
| 2,136,155 A | 11/1938 | Spicacci |
| 2,956,632 A | 10/1960 | Forbush et al. |
| 4,331,210 A | 5/1982 | Petrak |
| 4,378,868 A | 4/1983 | Petrak |
| 4,493,388 A | 1/1985 | Welschof et al. |
| 4,668,111 A | 5/1987 | Kapaan |
| 4,804,233 A | 2/1989 | Hofmann et al. |
| 4,881,842 A | 11/1989 | Farrell et al. |
| 4,893,960 A | 1/1990 | Beier et al. |
| 4,943,171 A | 7/1990 | Hofmann et al. |
| 4,958,944 A | 9/1990 | Hofmann et al. |
| 5,226,737 A | 7/1993 | Sandy, Jr. |
| 5,398,999 A | 3/1995 | Last |
| 5,536,098 A | 7/1996 | Schwarzler |
| 5,549,514 A | 8/1996 | Welschof |
| 5,590,967 A | 1/1997 | Kapaan |
| 5,674,024 A | 10/1997 | Daumal Castellon |
| 5,806,936 A | 9/1998 | Guimbretiere |
| 5,975,767 A | 11/1999 | Mizukoshi et al. |
| 6,036,371 A | 3/2000 | Onose |
| 6,135,571 A | 10/2000 | Mizukoshi et al. |
| 6,146,022 A | 11/2000 | Sahashi et al. |
| 6,190,262 B1 | 2/2001 | Miyazaki |

(Continued)

FOREIGN PATENT DOCUMENTS

| | | |
|---|---|---|
| DE | 4023020 | 1/1992 |
| WO | 2009125657 | 10/2009 |

OTHER PUBLICATIONS

International Search Report and Written Opinion mailed Mar. 26, 2012 in PCT Application No. PCT/US2011/060921.

(Continued)

*Primary Examiner* — Richard W Ridley
*Assistant Examiner* — Adam D Rogers
(74) *Attorney, Agent, or Firm* — Plumsea Law Group, LLC

(57) ABSTRACT

A wheel assembly for a motor vehicle, which includes a driveshaft member with a shortened stem portion. The wheel assembly also includes a bearing arrangement with an asymmetric configuration. An outboard bearing row may be disposed radially further from a central axis of a hub member than an inboard bearing row, and may have a diameter that is smaller than a diameter of the inboard bearing row. An outboard end of the stem portion may be generally aligned in the axial direction with the outboard bearing row. The stem portion length may approximately correspond to the bearing assembly length. Contact angles of a bearing assembly may be configured to distribute force over the wheel assembly. A fastening member may engage an outboard end of the stem portion and apply force to the hub member at a location inboard of the outboard bearing row.

47 Claims, 11 Drawing Sheets

(56) References Cited

U.S. PATENT DOCUMENTS

| | | | |
|---|---|---|---|
| 6,286,909 B1 | 9/2001 | Mizukoshi et al. | |
| 6,296,321 B1 | 10/2001 | Mizukoshi et al. | |
| 6,398,419 B1 | 6/2002 | Kashiwagi et al. | |
| 6,428,214 B2 | 8/2002 | Tajima et al. | |
| 6,488,589 B2 | 12/2002 | Ouchi et al. | |
| 6,524,011 B2 | 2/2003 | Miyazaki et al. | |
| 6,524,012 B1 | 2/2003 | Uchman | |
| 6,550,975 B2* | 4/2003 | Inoue et al. | 384/537 |
| 6,588,935 B1 | 7/2003 | Tajima et al. | |
| 6,626,581 B2 | 9/2003 | Uchman | |
| 6,648,518 B2 | 11/2003 | Uchman | |
| 6,688,773 B2 | 2/2004 | Webb et al. | |
| 6,702,472 B2 | 3/2004 | Sera et al. | |
| 6,712,707 B2 | 3/2004 | Ogura et al. | |
| 6,739,758 B2 | 5/2004 | Kashiwagi et al. | |
| 6,739,977 B2 | 5/2004 | Tajima et al. | |
| 6,749,517 B2 | 6/2004 | Ouchi | |
| 6,773,165 B2 | 8/2004 | Ozawa et al. | |
| 6,780,114 B2 | 8/2004 | Sahashi et al. | |
| 6,800,033 B2 | 10/2004 | Ouchi | |
| 6,851,865 B2 | 2/2005 | Nomura et al. | |
| 6,851,866 B2 | 2/2005 | Kayama et al. | |
| 6,877,350 B2 | 4/2005 | Fuhrmann et al. | |
| 6,880,247 B2 | 4/2005 | Toda et al. | |
| 6,902,325 B1 | 6/2005 | Uchman | |
| 6,926,448 B2 | 8/2005 | Ouchi | |
| 6,969,125 B2 | 11/2005 | Wang et al. | |
| 6,969,201 B2 | 11/2005 | Tajima | |
| 6,981,800 B2 | 1/2006 | Shibuya | |
| 7,004,637 B1 | 2/2006 | Uyama et al. | |
| 7,104,695 B2 | 9/2006 | Shevket | |
| 7,118,182 B2 | 10/2006 | Kayama et al. | |
| 7,121,632 B2 | 10/2006 | Grabaum | |
| 7,125,171 B2 | 10/2006 | Ouchi | |
| 7,172,510 B2 | 2/2007 | Fuhrmann et al. | |
| 7,195,399 B2 | 3/2007 | Myers et al. | |
| 7,220,183 B2 | 5/2007 | Fukushima et al. | |
| 7,232,374 B2 | 6/2007 | Tajima et al. | |
| 7,245,123 B2 | 7/2007 | Inoue et al. | |
| 7,255,482 B2* | 8/2007 | Yamamoto | 384/544 |
| 7,465,233 B2 | 12/2008 | Tajima et al. | |
| 7,475,738 B2 | 1/2009 | Frasier | |
| 7,614,796 B2 | 11/2009 | Hattori et al. | |
| 7,850,530 B2* | 12/2010 | Cermak | 464/178 |
| 7,862,242 B2* | 1/2011 | Ohtsuki | 384/544 |
| 8,100,775 B2* | 1/2012 | Hirai et al. | 464/178 |
| 8,256,967 B2* | 9/2012 | Langer et al. | 384/544 |
| 2004/0120622 A1 | 6/2004 | Tajima et al. | |
| 2004/0170344 A1 | 9/2004 | Tajima et al. | |
| 2004/0234182 A1 | 11/2004 | Tajima et al. | |
| 2005/0206223 A1 | 9/2005 | Im et al. | |
| 2006/0023984 A1 | 2/2006 | Terada et al. | |
| 2006/0051007 A1 | 3/2006 | Ishikawa | |
| 2006/0165332 A1 | 7/2006 | Terada et al. | |
| 2006/0192423 A1 | 8/2006 | Song et al. | |
| 2006/0269181 A1 | 11/2006 | Hattori et al. | |
| 2007/0117639 A1 | 5/2007 | Cermak | |
| 2007/0135220 A1 | 6/2007 | Welschof | |
| 2007/0227004 A1 | 10/2007 | Tsuzaki et al. | |
| 2008/0018170 A1 | 1/2008 | Cermak | |
| 2008/0205811 A1 | 8/2008 | Komori et al. | |
| 2008/0238184 A1 | 10/2008 | Cermak | |
| 2008/0242433 A1 | 10/2008 | Cermak et al. | |
| 2008/0277999 A1 | 11/2008 | Song et al. | |
| 2009/0074342 A1 | 3/2009 | Tajima et al. | |
| 2009/0129715 A1 | 5/2009 | Fukumura et al. | |
| 2009/0232435 A1 | 9/2009 | Ohtsuki | |

OTHER PUBLICATIONS

Notification Concerning Transmittal of International Preliminary Report On Patentability mailed Jun. 13, 2013 in PCT Application No. PCT/US2011/060921.

* cited by examiner

SHORTENED DRIVESHAFT STEM

BACKGROUND

The embodiments described herein relate generally to a motor vehicle, and in particular to a wheel assembly of a motor vehicle.

Wheel assemblies for motor vehicles have been previously proposed. Wheel assemblies typically include a hub that is connected to a driveshaft. The driveshaft may include a drive stem that is inserted through a hole in the hub. Various methods for retaining the drive stem inside of the hole of the hub have been proposed. The related art lacks provisions for substantially reducing weight and costs associated with a wheel assembly.

SUMMARY

In one aspect, a wheel assembly for a motor vehicle includes an axial direction including an axial outboard direction that is oriented towards an outer side of the motor vehicle along a central axis of a wheel of the wheel assembly, where the axial direction further includes an axial inboard direction that is oriented towards a longitudinal centerline of the motor vehicle along the central axis of the wheel. The wheel assembly also includes a hub member for mounting the wheel to the motor vehicle and the hub member includes a central hole. The wheel assembly also includes a bearing assembly including an outboard bearing row and an inboard bearing row, where the inboard bearing row is disposed axially inboard of the outboard bearing row. Also, the outboard bearing row is disposed radially further from a central axis of the hub member than the inboard bearing row. The outboard bearing row is associated with a first diameter and the inboard bearing row is associated with a second diameter such that the first diameter is substantially smaller than the second diameter.

In still another aspect, a wheel assembly for a motor vehicle includes an axial direction including an axial outboard direction that is oriented towards an outer side of the motor vehicle along a central axis of a wheel of the wheel assembly. The axial direction also includes an axial inboard direction that is oriented towards a longitudinal centerline of the motor vehicle along the central axis of the wheel. The wheel assembly also includes a hub member for mounting a wheel to the motor vehicle, where the hub member includes a central hole. The wheel assembly also includes a driveshaft including a stem portion, where the stem portion is configured to insert into the central hole. The wheel assembly also includes a bearing assembly with an outboard bearing row and an inboard bearing row. The inboard bearing row is disposed axially inboard of the outboard bearing row and the outboard bearing row is disposed radially further from a central axis of the hub member than the inboard bearing row. An outboard end of the stem portion is generally aligned in the axial direction with the outboard bearing row.

In still another aspect, a wheel assembly for a motor vehicle includes an axial direction with an axial outboard direction that is oriented towards an outer side of the motor vehicle along a central axis of a wheel of the wheel assembly. The axial direction includes an axial inboard direction that is oriented towards a longitudinal centerline of the motor vehicle along the central axis of the wheel. The wheel assembly also includes a hub member for mounting a wheel to the motor vehicle, where the hub member includes a central hole. The wheel assembly also includes a driveshaft including a stem portion. The stem portion is configured to insert into the central hole. The wheel assembly also includes a bearing assembly with an outboard bearing row and an inboard bearing row, where the inboard bearing row is disposed axially inboard of the outboard bearing row and the outboard bearing row is disposed radially further from a central axis of the hub member than the inboard bearing row. An outboard end of the stem portion approximately corresponds to an outboard end of the bearing assembly and an inboard end of the stem portion approximately corresponds to an inboard end of the bearing assembly.

In still another aspect, a wheel assembly for a motor vehicle includes an axial direction including an axial outboard direction that is oriented towards an outer side of the motor vehicle along a central axis of a wheel of the wheel assembly. The axial direction includes an axial inboard direction that is oriented towards a longitudinal centerline of the motor vehicle along the central axis of the wheel. The wheel assembly includes a hub member for mounting a wheel to the motor vehicle, where the hub member includes a central hole. The hub member includes an outboard flange portion. The wheel assembly also includes a driveshaft including a stem portion. The stem portion is configured to insert into the central hole. The wheel assembly also includes a bearing assembly with an outboard bearing row and an inboard bearing row. The inboard bearing row is disposed axially inboard of the outboard bearing row and the outboard bearing row is disposed radially further from a central axis of the hub member than the inboard bearing row. The bearing assembly includes an inner raceway surface and an outer raceway surface. The inner raceway surface includes a first portion associated with the outboard bearing row and the inner raceway surface includes a second portion associated with the inboard bearing row. A contact angle formed with the first portion intersects a central axis of the hub member at a position that is between the outboard flange portion and an outboard end of the stem portion.

In another aspect, a wheel assembly for a motor vehicle includes an axial direction including an axial outboard direction that is oriented towards an outer side of the motor vehicle along a central axis of a wheel of the wheel assembly. The axial direction includes an axial inboard direction that is oriented towards a longitudinal centerline of the motor vehicle along the central axis of the wheel. The wheel assembly also includes a hub member for mounting a wheel to the motor vehicle, where the hub member includes a central hole. The hub member includes an outboard flange portion. The wheel assembly also includes a driveshaft including a stem portion, where the stem portion is configured to insert into the central hole. The wheel assembly also includes a bearing assembly includes an outboard bearing row and an inboard bearing row. The inboard bearing row is disposed axially inboard of the outboard bearing row and the outboard bearing row is disposed radially further from a central axis of the hub member than the inboard bearing row. The bearing assembly includes an inner raceway surface and an outer raceway surface. The inner raceway surface includes a first portion associated with the outboard bearing row. The inner raceway surface includes a second portion associated with the inboard bearing row. The first portion is associated with a contact angle. The stem portion includes an outboard end. The contact angle intersects a central axis of the hub member at the outboard end of the stem portion.

In one aspect, a wheel assembly for a motor vehicle includes an axial direction including an axial outboard direction that is oriented towards an outer side of the motor vehicle along a central axis of a wheel of the wheel assembly and the axial direction further includes an axial inboard direction that is oriented towards a longitudinal centerline of the motor vehicle along the central axis of the wheel. The wheel assembly also includes a hub member for mounting a wheel to the motor vehicle, where the hub member includes a central hole. The hub member further includes an outboard flange portion. The wheel assembly also includes a driveshaft including a stem portion, where the stem portion is configured to insert into the central hole. The wheel assembly also includes a bearing assembly comprising an outboard bearing row and an inboard bearing row. The inboard bearing row is disposed axially inboard of the outboard bearing row. The outboard bearing row being disposed radially further from a central axis of the hub member than the inboard bearing row. The wheel assembly also includes a fastening member configured to engage an outboard end of the stem portion. The fastening member applies a force to the hub member at a location inboard of the outboard bearing row.

Other systems, methods, features and advantages will be, or will become apparent to one of ordinary skill in the art upon examination of the following figures and detailed description. It is intended that all such additional systems, methods, features and advantages be included within this description and this summary, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Figure 1:
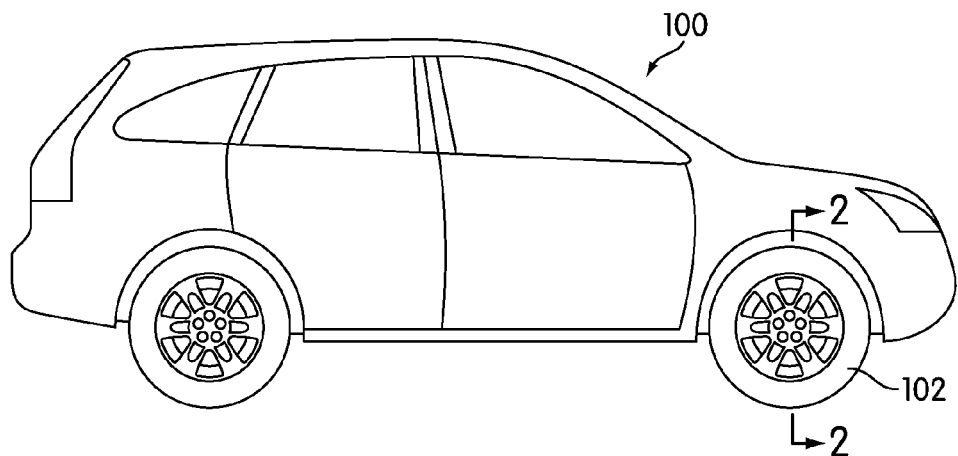
FIG. 1 is a side view of a motor vehicle.

FIG. 1 is a side view of a motor vehicle 100, including wheel 102. The term "motor vehicle" as used throughout the specification and claims refers to any moving vehicle that is capable of carrying one or more human occupants and is powered by any form of energy. The term "motor vehicle" includes, but is not limited to: cars, trucks, vans, minivans, SUVs, motorcycles, scooters, boats, personal watercraft, and aircraft. In one exemplary embodiment, motor vehicle 100 may be a sports utility vehicle (SUV).

In some cases, the motor vehicle includes one or more engines. The term "engine" as used throughout the specification and claims refers to any device or machine that is capable of converting energy. In some cases, potential energy is converted into kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy. For example, some engines include regenerative braking systems where kinetic energy from a drivetrain is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

Figure 2:
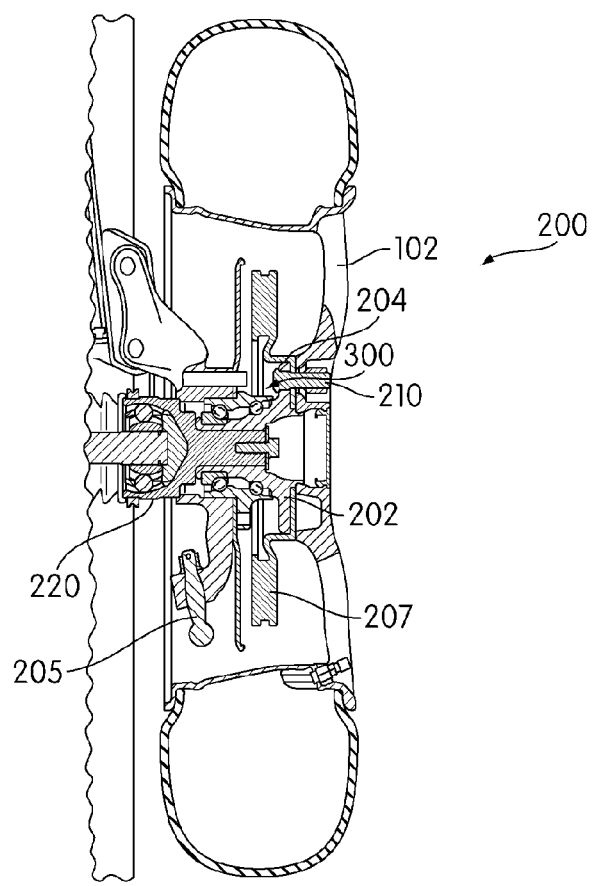
FIG. 2 is a cross sectional view of an embodiment of a wheel assembly for a motor vehicle.

FIG. 2 illustrates a cross sectional view of an embodiment of a wheel assembly for a motor vehicle. The term "wheel assembly" refers to one or more components of a motor vehicle that are used for mounting a wheel to a vehicle. For purposes of clarity, only some components of a wheel assembly are illustrated in the current embodiment. Furthermore, one or more components shown in this embodiment could be optional and may not be included in other embodiments. It should also be understood that the wheel assembly discussed for wheel 102 may be similar to wheel assemblies used with other wheels of motor vehicle 100.

For consistency and convenience, directional adjectives are employed throughout this detailed description corresponding to the illustrated embodiments. Components of a wheel assembly can be associated with an axial direction that is generally parallel with a central axis of a wheel. The axial direction may include an axial outboard direction that is oriented towards an outer side of the motor vehicle along the central axis of the wheel. In addition, the axial direction can include an axial inboard direction that is oriented towards a longitudinal centerline of the motor vehicle along the central axis of the wheel.

Referring to FIG. 2, wheel assembly 200 may comprise a plurality of components configured for mounting wheel 102 to motor vehicle 100 in a manner that allows wheel 102 to be rotated. In some cases, wheel assembly 200 can comprise hub member 202 and driveshaft member 220. Wheel 102 may be mounted directly to hub member 202, which is further connected to driveshaft member 220. In embodiments where wheel 102 is a drive wheel, driveshaft member 220 may deliver torque from a powertrain system of motor vehicle 100. In addition, in some cases, torque generated at wheel 102 may be transmitted to a powertrain system via driveshaft member 220.

In some embodiments, wheel assembly 200 may also include bearing assembly 300 that is associated with hub member 202. In some cases, bearing assembly 300 may facilitate the attachment of various components to wheel assembly 200 that are not configured to rotate with hub member 202 or wheel 102. For example, in some embodiments, knuckle member 205 may be mounted or otherwise attached to a portion of bearing assembly 300 for purposes of steering wheel 102.

Additionally, in some cases, wheel assembly 200 can be provided with additional components. In one embodiment, wheel assembly 200 may include brake disk 207. In other embodiments, wheel assembly 200 may include still other components.

Wheel assembly 200 can include provisions for mounting wheel 102 to hub member 202. In some embodiments, hub member 202 can include outboard flange portion 204 that may be configured to attach to wheel 102. For example, outboard flange portion 204 may include a bolt hole that is configured to receive a bolt. In addition, wheel 102 may comprise a corresponding bolt hole that is also configured to receive a bolt. Using this arrangement, wheel 102 can be connected to hub member 202 via wheel bolt 210 that is inserted through the corresponding bolt holes of hub member 202 and wheel 102. In some embodiments, a corresponding nut can be secured around an end portion of wheel bolt 210 for fixing wheel bolt 210 in place and thereby securing wheel 102 to hub member 202. Although only a single wheel bolt is illustrated in the current embodiment, it will be understood that wheel 102 and hub member 202 may be attached at multiple locations using additional bolts. Furthermore, other embodiments could use different methods for securing wheel 102 to hub member 202.

Figure 3:
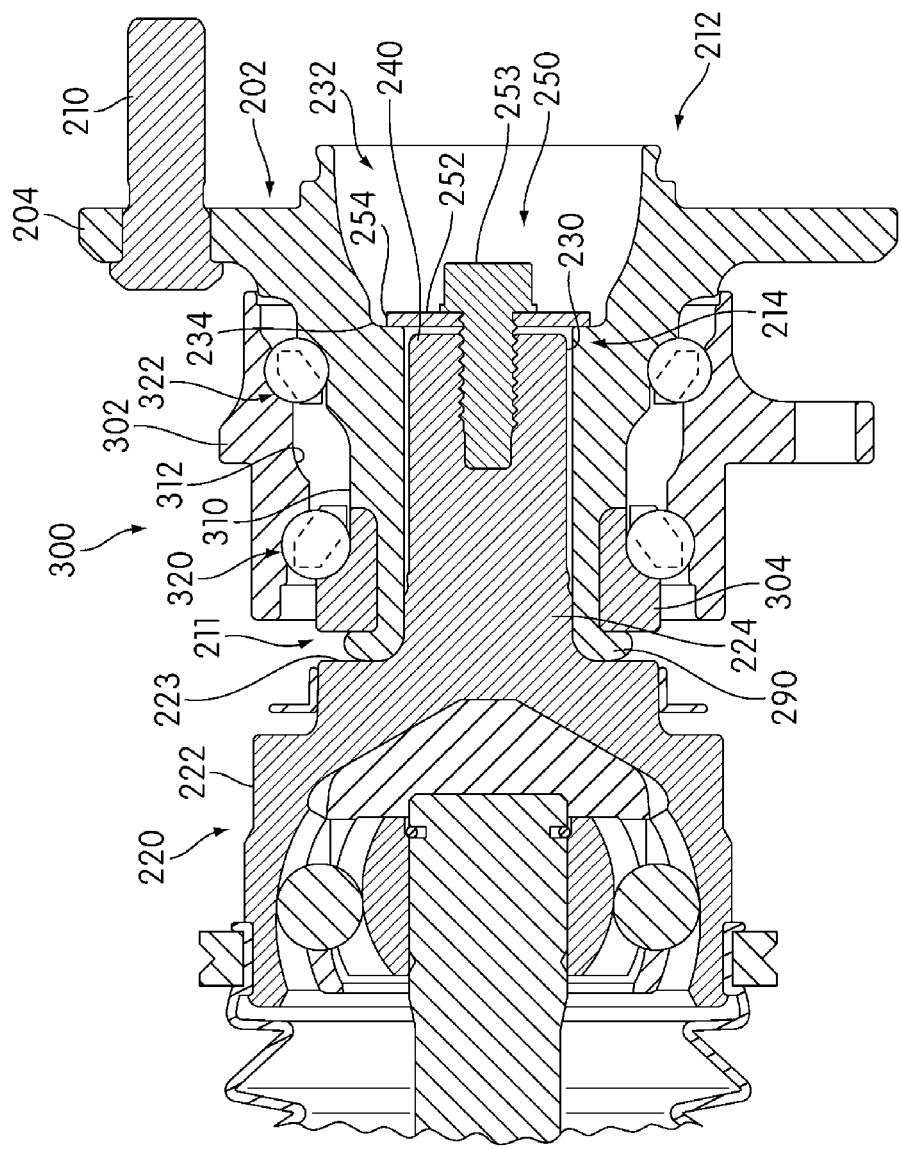
FIG. 3 is a cross sectional view of an embodiment of a portion of a wheel assembly for a motor vehicle.
Figure 4:
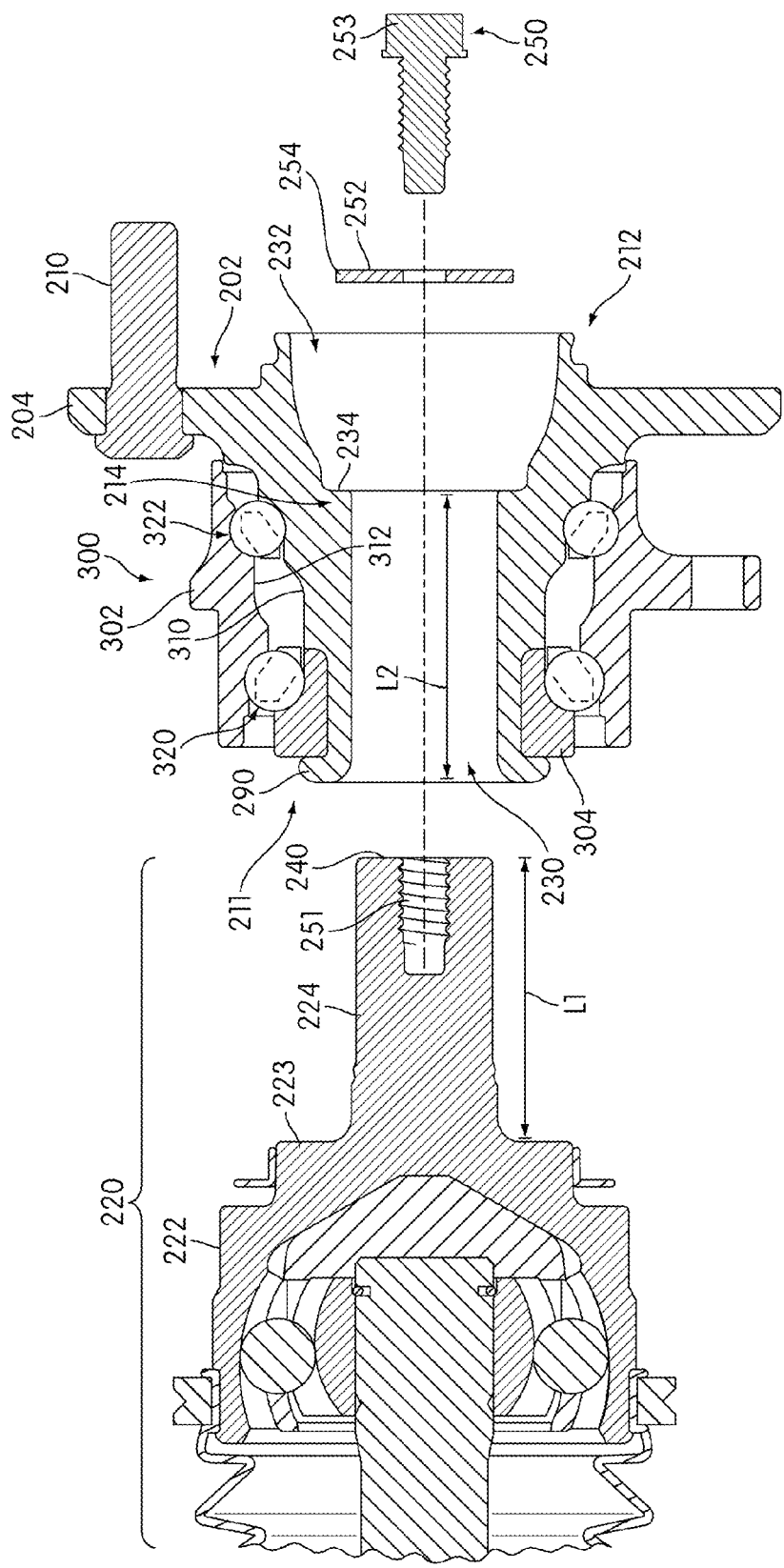
FIG. 4 is an exploded cross sectional view of an embodiment of a portion of a wheel assembly for a motor vehicle.

FIGS. 3 and 4 illustrate an embodiment of hub member 202, driveshaft 220 and bearing assembly 300 in greater detail. In particular, FIG. 3 illustrates an assembled view of an embodiment of hub member 202 and driveshaft 220, while FIG. 4 illustrates an exploded view of an embodiment of hub member 202 and driveshaft 220. Referring to FIGS. 3 and 4, in some embodiments, hub member 202 may be configured with inboard end 211, outboard end 212 and intermediate portion 214 disposed between inboard end 211 and outboard end 212. Hub member 202 may further include central hole 230 that extends from inboard end 211 to intermediate portion 214. Also, hub member 202 can include outer cavity 232 that extends from intermediate portion 214 to outboard end 212.

In some cases, driveshaft member 220 may comprise joint portion 222 and stem portion 224 that extends from joint portion 222. Joint portion 222 may be any type of joint configured to transmit rotational power. As an example, in some embodiments, joint portion 222 may be associated with a constant velocity joint. In other embodiments, however, other types of joints could be used. In some cases, stem portion 224 may have an approximately cylindrical shape and may extend in an outboard direction from joint portion 222. In other cases, stem portion 224 could have any other shape.

As discussed above, in some embodiments, driveshaft member 220 may be mounted to hub member 202. In some cases, central hole 230 may be configured to receive stem portion 224 of driveshaft member 220. In one embodiment, central hole 230 may be configured with a substantially cylindrical shape that is configured to receive stem portion 224. In an exemplary embodiment, central hole 230 may be configured with a diameter that is large enough to accommodate stem portion 224.

Wheel assembly 200 can include provisions for preventing rotational movement between stem portion 224 and hub portion 202. In some cases, stem portion 224 and central hole 230 can be provided with corresponding interlocking splines that help reduce rotational slip. In other cases, stem portion 224 and central hole 230 can be provided with other features for reducing rotational slip. As an example, in another embodiment a helix interference serration can be applied on stem portion 224 and/or central hole 230 for purposes of reducing rotational slip.

Wheel assembly 200 can include provisions for preventing axial movement between stem portion 224 and central hole 230. Generally, any type of fastener may be used for securing stem portion 224 within central hole 230. In some embodiments, stem portion 224 can include a threaded end portion that is configured to receive a spindle nut. In other embodiments, stem portion 224 can be configured to receive a bolt and a fastening member that help to secure stem portion 224 in place with respect to hub member 202. In still other embodiments, stem portion 224 can be configured to receive a retaining ring of some kind that helps to prevent axial movement with respect to hub member 202.

In one embodiment, outboard end 240 of stem portion 224 may be configured to receive bolt 250. In some cases, outboard end 240 may be provided with threaded cavity 251 that is configured to receive bolt 250. In addition, in some embodiments, fastening member 252 may be secured between bolt head 253 and outboard end 240. In some cases, fastening member 252 may be an annular member with an outer diameter that is substantially larger than the diameter of central hole 230. In particular, outer periphery 254 of fastening member 252 may abut interior wall 234 of outer cavity 232 of hub member 202. With this arrangement, stem portion 224 may be prevented from moving in an axial inboard direction through central hole 230. It will also be understood that in some embodiments, shoulder portion 223 of joint portion 222 may abut inboard end 211 of hub member 202 to prevent stem portion 224 from moving in an axial outboard direction through central hole 230. In other words, shoulder portion 223 and fastening member 252 help to secure stem portion 224 in a substantially constant axial position with respect to hub portion 202. In some cases, fastening member 252 and bolt 250 may not be separate pieces, but may be integrated as a single piece. In other words, in some cases, fastening member 252 may be a flange-like portion of bolt 250 that helps to prevent stem portion 225 from moving in an inboard direction.

As previously discussed, wheel assembly 200 can include bearing assembly 300. In some embodiments, bearing assembly 300 can be associated with a portion of hub member 202 as well as outer member 302 that is disposed radially outwards of hub member 202. In some cases, bearing assembly 300 may comprise inner raceway surface 310 that is formed on hub member 202. Bearing assembly 300 may also comprise outer raceway surface 312 that is formed on outer member 302.

Bearing assembly 300 may be associated with one or more bearing rows. The term "bearing row" refers to a passage between hub member 202 and outer member 302 through which one or more bearings can pass. A bearing row may have a cross-sectional shape that is configured to receive bearings of a predetermined shape and size. In some cases, bearing assembly 300 can include one bearing row. In other cases, bearing assembly 300 can include two bearing rows. In still other cases, bearing assembly 300 can include more than two bearing rows. In an exemplary embodiment, bearing assembly 300 can include inboard bearing row 320 and outboard bearing row 322.

Generally, any type of bearing may be used with bearing assembly 300. In some cases, roller bearings may be used. In other cases, ball bearings can be used. In still other cases, roller bearings may be used for some bearing rows while ball bearings may be used for other bearing rows. In an exemplary embodiment, inboard bearing row 320 and outboard bearing row 322 may both be associated with ball bearings.

In some embodiments, bearing assembly 300 can further comprise an inner ring that is separate from hub member 202 and outer member 302. For example, the current embodiment includes inner ring 304 that is disposed on a portion of hub member 202 adjacent to inboard end 211. In this case, bearings disposed within inboard bearing row 320 may be disposed between a radially inner surface of outer member 302 and a radially outer surface of inner ring 304. In contrast, bearings disposed within outboard bearing row 322 may be disposed between a radially inner surface of outer member 302 and a radially outer surface of hub member 202. With this arrangement, inner ring 304 may help support bearings of inboard bearing row 320.

In some embodiments, wheel assembly 200 can include provisions for preloading bearings of bearing assembly 300. In some cases, shoulder portion 223 of joint portion 222 can be depressed against a portion of bearing assembly 300 to preload bearings in inward bearing row 320 as well as outward bearing row 322. In other cases, hub member 202 can be provided with a swaged portion for applying a preloading force to bearing assembly 300. In an exemplary embodiment, inboard end 211 of hub member 202 may include swaged portion 290 that is configured to provide a preloading force for bearing assembly 300. In some cases, swaged portion 290 may apply a compressive force that compresses inner ring 304 axially outwards and thereby preloads inboard bearing row 320 and/or outboard bearing row 322. This swaging may reduce the preloading that occurs at outboard end 240 of stem portion 224, which can help reduce internal drag and increase performance of motor vehicle 100.

In some embodiments, the shape of a bearing assembly can be modified to reduce the weight of the bearing assembly. For example, in some cases, a bearing assembly can be provided with a substantially asymmetric shape that reduces the overall size and weight of a bearing assembly. In some cases, an asymmetric bearing configuration can be created by modifying the shapes of a radially outer surface of a hub member and a radially inner surface of an outer member. In an exemplary embodiment, both the inner raceway surface and the outer raceway surface of the bearing assembly may be provided with a stepped configuration that provides for an outboard bearing row that is radially further from a central axis of the driveshaft member than an inboard bearing row.

Figure 5:
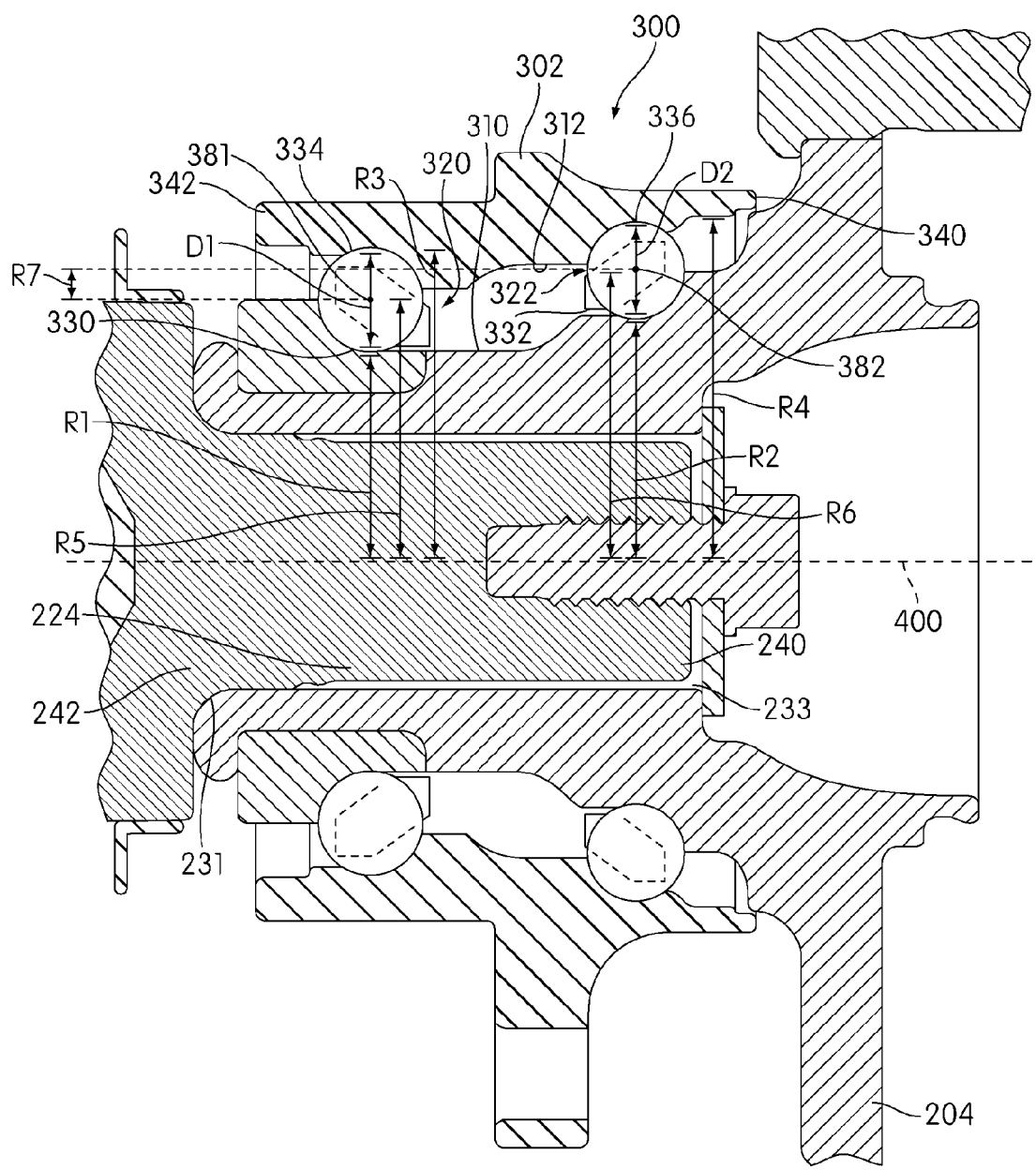
FIG. 5 is an enlarged cross sectional view of an embodiment of a portion of a wheel assembly for a motor vehicle.

Referring to FIG. 5, bearing assembly 300 can be provided with an asymmetric bearing configuration. In one embodiment, a radially inner portion of inboard bearing row 320 may be disposed radial distance R1 from central axis 400 that is directed in an axial direction through the center of stem portion 224 and central hole 230. In other words, first portion 330 of inner raceway surface 310 may be disposed radial distance R1 from central axis 400. Also, a radially inner portion of outboard bearing row 322 may be disposed radial distance R2 from central axis 400. In other words, second portion 332 of inner raceway surface 310 may be disposed radial distance R2 from central axis 400.

In some cases, radial distance R1 may be substantially greater than radial distance R2. In other cases, radial distance R2 may be substantially greater than radial distance R1. In still other cases, radial distance R1 may be substantially similar to radial distance R2. In an exemplary embodiment, radial distance R2 may be substantially greater than radial distance R1. In particular, second portion 332 of inner race surface 310 may be disposed radially further from central axis 400 than first portion 330. With this arrangement, outboard bearing row 322 may be disposed radially further from central axis 400 of stem portion 224 than inboard bearing row 320.

In some embodiments, a radially outer portion of inboard bearing row 320 may be disposed radial distance R3 from central axis 400. In other words, first portion 334 of outer raceway surface 312 may be disposed radial distance R3 from central axis 400. Also, a radially outer portion of outboard bearing row 322 may be disposed radial distance R4 from central axis 400. In other words, second portion 336 of outer raceway surface 312 may be disposed radial distance R4 from central axis 400. In some cases, radial distance R3 may be substantially greater than radial distance R4. In other cases, radial distance R4 may be substantially greater than radial distance R3. In still other cases, radial distance R3 may be substantially similar to radial distance R4. In an exemplary embodiment, radial distance R4 may be substantially greater than radial distance R3. In particular, second portion 336 of inner race surface 310 may be disposed radially further from central axis 400 than first portion 334. With this arrangement, a radially outer portion of outboard bearing row 322 may be disposed radially further from central axis 400 of stem portion 224 than an outer portion of inboard bearing row 320. This configuration can help to increase axial loading for bearing assembly 300. The stepped configuration may help maintain increased strength for wheel assembly 200 at outboard end 212 of hub member 202. In particular, clearance for fastening member 252 may be provided without reducing the overall thickness and material strength of hub member 202 at outboard end 212.

In some embodiments, the centers of an inboard bearing row and an outboard bearing row may be spaced apart in a radial direction. In this embodiment, bearing center line 381 of inboard bearing row 320 may be disposed radial distance R5 from central axis 400. In addition, bearing center line 382 of outboard bearing row 322 may be disposed radial distance R6 from central axis 400. In some cases, radial distance R5 may be larger than radial distance R6. In other cases, radial distance R5 may be less than radial distance R6. In still other cases, radial distance R5 may be approximately equal to radial distance R6. In an exemplary embodiment, radial distance R6 may be substantially larger than radial distance R5. In particular, in one embodiment, bearing center line 382 of outboard bearing row 322 may be disposed radially further from central axis 400 than bearing center line 381 of inboard bearing row 320 by radial distance R7. With this arrangement, bearing assembly 300 may be provided with an increased axial loading capacity.

In some embodiments, the bearing size associated with two or more bearing rows can vary to enhance the asymmetric configuration for a bearing assembly. In the current embodiment, inboard bearing row 320 may be associated with bearings having a diameter D1, while outboard bearing row 322 may be associated with bearings having a diameter D2. In some cases, diameter D1 may be substantially greater than diameter D2. In other cases, diameter D2 may be substantially greater than diameter D1. In still other cases, diameter D1 may be substantially similar to diameter D2. In an exemplary embodiment, diameter D1 may be substantially greater than diameter D2. In other words, the bearings of inboard bearing row 320 may be substantially larger than the bearings of outboard bearing row 322. This asymmetric bearing configuration may help increase the stiffness of bearing assembly 300 over symmetric bearing configurations. By increasing the stiffness, the geometry of outer member 302 and hub member 202 can be modified to reduce the overall weight of wheel assembly 200.

A wheel assembly can also include provisions for reducing the weight of a driveshaft member. In some cases, the length of a driveshaft can be reduced to reduce the weight of the driveshaft member. In an exemplary embodiment, the length of a stem portion can be substantially reduced to reduce the driveshaft member weight. Additionally, in some cases, reducing the stem length of a driveshaft member can help reduce drag on a wheel assembly.

In some embodiments, wheel assembly 200 may be provided with a shortened stem portion. In previous designs, a stem portion for a driveshaft may extend axially outwards past a flange portion of a hub. In the exemplary embodiment, however, outboard end 240 of stem portion 224 is disposed axially inwards of outward flange portion 204. In addition, the stem portion of the current embodiment may have a length that is approximately similar to the length of a central hole within a hub member. In the current embodiment, stem portion 224 may be associated with an axial length L1 (see FIG. 4). Also, central hole 230 may be associated with an axial length L2. In some cases, axial length L1 may be substantially greater than axial length L2. In other cases, axial length L2 may be substantially greater than axial length L1. In an exemplary embodiment, axial length L1 may be substantially equal to axial length L2. In other words, inboard end 242 of stem portion 224 may be generally aligned in the axial direction with inboard end 231 of central hole 230. Likewise, outboard end 240 of stem portion 224 may be generally aligned in the axial direction with outboard end 233 of central hole 230. This arrangement may increase the strength of stem portion 224 over designs where a stem portion may extend outwards from a central hole in the hub member and/or past a flange portion of the hub member. Moreover, this reduced length for stem portion 224 can help reduce the overall weight of wheel assembly 200. Furthermore, in some cases, the reduced stem length can reduce drag on wheel assembly 200.

In some embodiments, bearing assembly 300 could be provided with a substantially wide bearing arrangement. In one embodiment, the end portions of bearing assembly 300 may approximately correspond to the ends of stem portion 224. In some cases, outboard end 240 of stem portion 224 may approximately correspond to outboard end portion 340 of bearing assembly 300. In addition, inboard end 242 of stem portion 224 may approximately correspond to inboard end 342 of bearing assembly 300. Furthermore, in this embodiment, outboard bearing row 322 may be approximately aligned with outboard end 240 of stem portion 224 in an axial direction. Additionally, inboard bearing row 320 may be approximately aligned with inboard end 242 of stem portion 224 in an axial direction. With this arrangement, wheel assembly 200 may be provided with a widened bearing assembly that can help transfer forces over a substantial majority of hub member 202.

Figure 6:
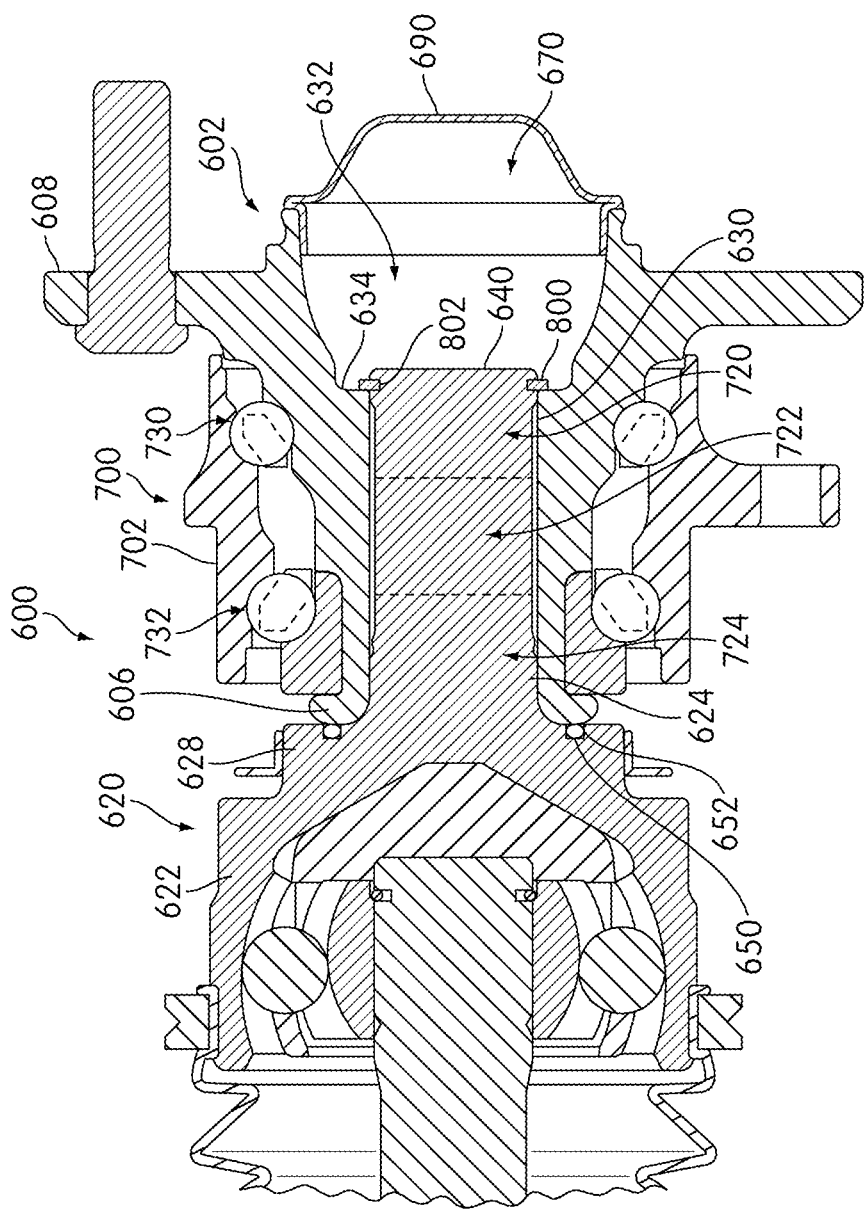
FIG. 6 is a cross sectional view of an embodiment of a portion of a wheel assembly for a motor vehicle.

FIG. 6 illustrates another embodiment of wheel assembly 600 for a motor vehicle. Referring to FIG. 6, wheel assembly 600 may comprise similar features to wheel assembly 200 described above. In particular, wheel assembly 600 may comprise hub member 602, driveshaft member 620 and bearing assembly 700. Hub member 602 may be substantially similar to hub member 202 of the previous embodiment. Additionally, hub member 602 may include flange portion 608 at outboard end 640 of hub member 602.

Driveshaft member 620 may comprise joint portion 622 and stem portion 624. In some cases, stem portion 624 may be configured to insert through central hole 630 of hub member 602. In one embodiment, outboard end 640 of stem portion 624 may also extend into a portion of outer cavity 632 of hub member 602. In other cases, however, outboard end 640 may not extend outside of central hole 630.

Wheel assembly 600 can include provisions for securing stem portion 624 in place with respect to hub portion 602. In this exemplary embodiment, wheel assembly 600 can be provided with fastener 800 for securing stem portion 624 in place in an axial direction. Generally, fastener 800 can be any type of fastener. In some cases, fastener 800 can be a retaining ring of some kind. In other cases, fastener 800 can be a clip. In an exemplary embodiment, fastener 800 can be a circlip that has a generally circular geometry.

In an exemplary embodiment, fastener 800 may be configured to wrap around outboard end 640 of stem portion 624. In some cases, fastener 800 may engage groove 802 of stem portion 624. In addition, fastener 800 may have a diameter that is substantially larger than a diameter of central hole 630. Moreover, fastener 800 may be configured to abut a portion of interior wall 634 of outer cavity 632. With this arrangement, fastener 800 may prevent stem portion 624 from moving in an axially inboard direction.

Wheel assembly 600 can also include additional provisions for preventing fluid and debris from entering the space between stem portion 624 and hub member 602. In some embodiments, for example, driveshaft member 620 can be provided with a sealing ring that helps prevent debris from entering the space between driveshaft member 620 and hub member 602. In one embodiment, driveshaft member 620 can comprise o-ring 650 that is disposed within retaining cavity 652 of joint portion 622. In some cases, retaining cavity 652 may be disposed on shoulder portion 628 of joint portion 622. Using this configuration, o-ring 650 may be disposed between shoulder portion 628 of joint portion 622 and swaged portion 606 of hub member 602. This arrangement may help prevent debris from collecting between stem portion 624 and hub member 602 in an axial direction as o-ring 650 can expand to fill any gaps that occur between driveshaft 620 and hub member 602.

Wheel assembly 600 can also include provisions for covering and protecting outer cavity 632. In one embodiment, outer cavity 632 can be provided with outboard hub cap 690 that is mounted to outboard opening 670 of outer cavity 632. This arrangement can help prevent debris and water from entering outer cavity 632.

In some embodiments, bearing assembly 700 may be disposed around hub member 602 in a circumferential manner. Bearing assembly 700 may comprise outboard bearing row 730 and inboard bearing row 732 that are disposed between hub member 602 and outer member 702. In one embodiment, bearing assembly 700 may comprise a substantially similar asymmetric bearing configuration to bearing assembly 300 discussed above. In particular, in one embodiment, outboard bearing row 730 may be disposed radially further from a central axis of hub member 602 than inboard bearing row 732. Additionally, in one embodiment, outboard bearing row 703 may have a smaller diameter than inboard bearing row 732. In other embodiments, however, bearing assembly 700 could have any other type of configuration including a symmetric configuration.

Wheel assembly 600 can be provided with a substantially wide bearing arrangement. For purposes of understanding the arrangement of stem portion 624 with respect to bearing arrangement 700, stem portion 624 can be provided with first end portion 720, second end portion 724 and intermediate portion 722 that is disposed between first end portion 720 and second end portion 724. In some cases, first end portion 720, second end portion 724 and intermediate portion 722 may have substantially similar axial lengths. In other words, in some cases, first end portion 720, second end portion 724 and intermediate portion 722 may each comprise approximately one third of the length of stem portion 624. In an exemplary embodiment, outboard bearing row 730 may approximately correspond to first end portion 720 in an axial direction. Also, inboard bearing row 732 may approximately correspond to second end portion 724 in the axial direction. With this arrangement, outboard bearing row 730 and inboard bearing row 732 may approximately correspond to the outer third portions of stem portion 624, which may help to distribute forces from bearing assembly 700 over a substantial majority of stem portion 624 and help increase axial loading.

Figure 7:
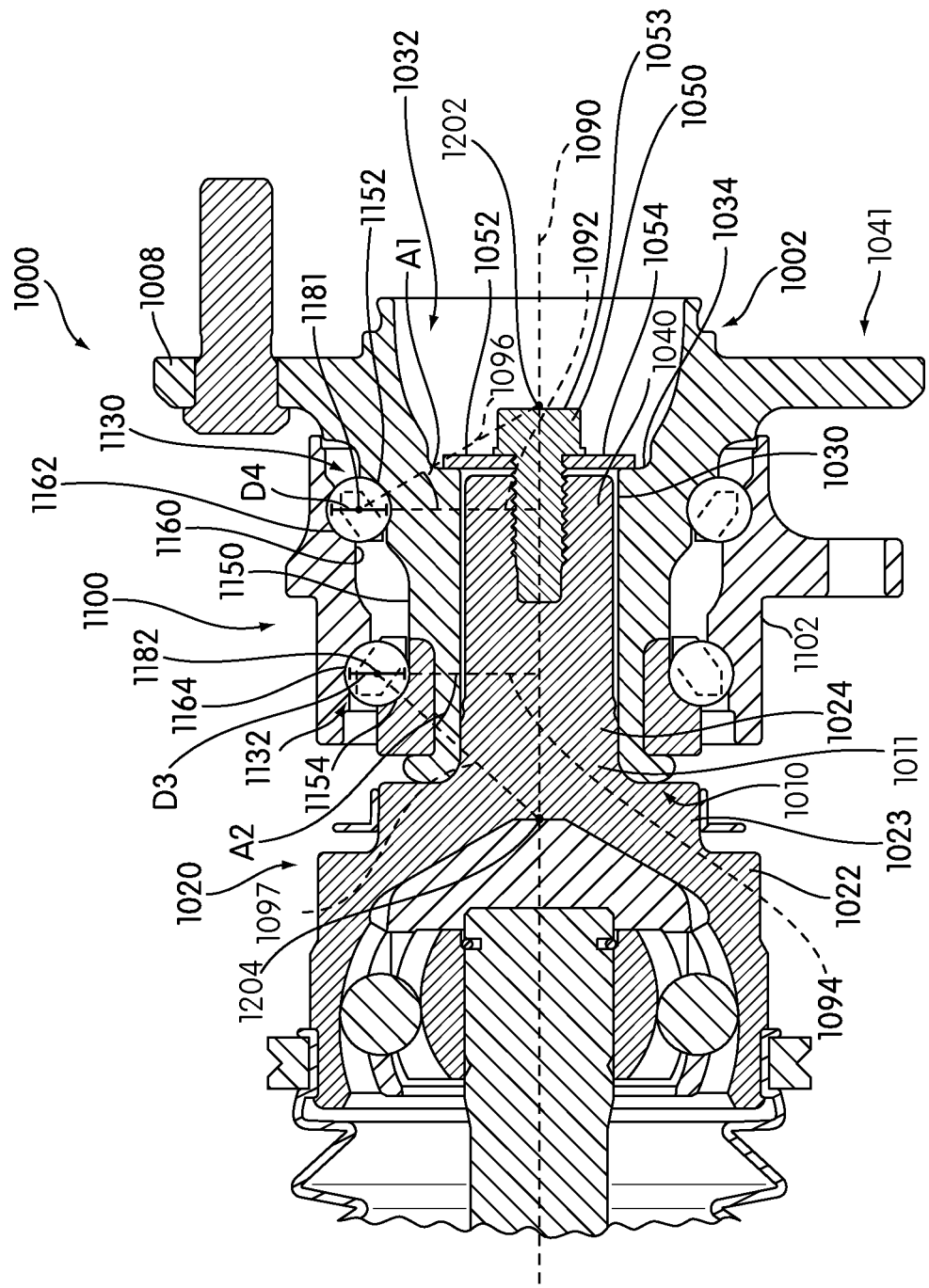
FIG. 7 is a cross sectional view of another embodiment of a portion of a wheel assembly for a motor vehicle.

FIG. 7 illustrates another embodiment of wheel assembly 1000. Referring to FIG. 7, wheel assembly 1000 may comprise similar features to wheel assembly 200 described above. In particular, wheel assembly 1000 may comprise hub member 1002, driveshaft member 1020 and bearing assembly 1100. Hub member 1002 may include outboard flange portion 1008 at outboard end 1041 of hub member 1002.

Driveshaft member 1020 may comprise joint portion 1022 and stem portion 1024. In some cases, stem portion 1024 may be configured to insert through central hole 1030 of hub member 1002. In one embodiment, outboard end 1040 of stem portion 1024 may also extend into a portion of outer cavity 1032 of hub member 1002. In other cases, however, outboard end 1040 may not extend outside of central hole 1030.

Wheel assembly 1000 can include provisions for preventing axial movement between stem portion 1024 and central hole 1030. Generally, any type of fastener may be used for securing stem portion 1024 within central hole 1030. In some embodiments, stem portion 1024 can include a threaded end portion that is configured to receive a spindle nut. In other embodiments, stem portion 1024 can be configured to receive a bolt and a fastening member that help to secure stem portion 1024 in place with respect to hub member 1002. In still other embodiments, stem portion 1024 can be configured to receive a retaining ring of some kind that helps to prevent axial movement with respect to hub member 1002.

In one embodiment, outboard end 1040 of stem portion 1024 may be configured to receive bolt 1050. In some cases, outboard end 1040 of stem portion 1024 may be provided with threading that is configured to receive bolt 1050. In addition, in some embodiments, fastening member 1052 may be secured between bolt head 1053 and outboard end 1040 of stem portion 1024. In some cases, fastening member 1052 may be an annular member with an outer diameter that is substantially larger than the diameter of central hole 1030. In particular, outer periphery 1054 of fastening member 1052 may abut interior wall 1034 of outer cavity 1032 of hub member 1002. With this arrangement, stem portion 1024 may be prevented from moving in an axial inboard direction through central hole 1030. It will also be understood that in some embodiments, shoulder portion 1023 of joint portion 1022 may abut inboard end 1010 of hub member 1002 to prevent stem portion 1024 from moving in an axial outboard direction through central hole 1030. In other words, shoulder portion 1023 and fastening member 1052 help to secure stem portion 1024 in a substantially constant axial position with respect to hub portion 1002.

In some embodiments, bearing assembly 1100 may be disposed around hub member 1002 in a circumferential manner. Bearing assembly 1100 may comprise outboard bearing row 1130 and inboard bearing row 1132 that are disposed between hub member 1002 and outer member 1102. In one embodiment, bearing assembly 1100 may comprise a substantially similar asymmetric bearing configuration to bearing assembly 300 discussed above. In particular, in one embodiment, outboard bearing row 1130 may be disposed radially further from a central axis of hub member 1002 than inboard bearing row 1132.

Generally, the diameters of one or more bearings associated with bearing assembly 1100 may vary. In some cases, bearings associated with an inboard row could have substantially similar diameters to bearings associated with an outboard row. In other cases, bearings associated with an outboard row could have larger diameters than bearings associated with an inboard row. In still other cases, bearing associated with an outboard row could have smaller diameters than bearing associated with an inboard row.

In one embodiment, inboard bearing row 1132 may be associated with bearings having diameter D3. In addition, outboard bearing row 1130 may be associated with bearings having diameter D4. In an exemplary embodiment, diameter D3 may be substantially equal to diameter D4. In other words, in contrast to the previous embodiment, the bearings associated with inboard bearing row 1132 and outboard bearing row 1130 may have substantially similar sizes. In some cases, diameter D3 and diameter D4 may have values in the range between 8 mm and 15 mm. In an exemplary embodiment, diameter D3 and diameter D4 may both have values of approximately 11 mm.

Bearing assembly 1100 can include inner raceway surface 1150. Inner raceway surface 1150 may further include first portion 1152 and second portion 1154 associated with outboard bearing row 1130 and inboard bearing row 1132, respectively. Bearing assembly 1100 can also include outer raceway surface 1160. Outer raceway surface 1160 may further include first portion 1162 and second portion 1164 associated with outboard bearing row 1130 and inboard bearing row 1132. In other words, bearings in outboard bearing row 1130 may be in contact with first portion 1152 of inner raceway surface 1150 and first portion 1162 of outer raceway surface 1160. Likewise, bearings in inboard bearing row 1132 may be in contact with second portion 1154 of inner raceway surface 1150 and second portion 1164 of outer raceway surface 1160.

A wheel assembly can include provisions for evenly distributing the forces applied by a bearing assembly. In some cases, the contact angles associated with a bearing assembly can be selected to achieve an optimum force distribution over the wheel assembly.

For purposes of discussing contact angles, wheel assembly 1000 may be associated with central axis 1090. Moreover, first center line axis 1092 is an axis extending from first bearing center line 1181 of outboard bearing row 1130 to central axis 1090. In particular, first center line axis 1092 is substantially perpendicular to central axis 1090. Also, second center line axis 1094 is an axis extending from second bearing center line 1182 of inboard bearing row 1132 to central axis 1090. In particular, second center line axis 1094 is substantially perpendicular to central axis 1090.

In the current embodiment, first portion 1152 of inner raceway surface 1150 may form first contact angle A1 with respect to first center line axis 1092. In other words, contact angle A1 is the angle formed between first center line axis 1092 and first contact axis 1096, which is an axis normal to first portion 1152. Furthermore, first contact angle A1 may intersect central axis 1090 at first position 1202. In other words, first contact axis 1096, which is angled with respect to first center line axis 1092 by contact angle A1, may intersect central axis 1090 at first position 1202. In this case, first position 1202 is disposed between outboard flange portion 1008 and outboard end 1040 of stem portion 1024 in the axial direction. In some cases, first position 1202 may be disposed closer to outboard flange portion 1008 than outboard end 1040. In other cases, first position 1202 may be approximately aligned with outboard flange portion 1008. In a similar manner, second portion 1154 of inner raceway surface 1150 may form second contact angle A2 with respect to second center line axis 1094. In other words, contact angle A2 is the angle formed between second center line axis 1094 and second contact axis 1097, which is an axis normal to second portion 1154. Furthermore, second contact angle A2 may intersect central axis 1090 at second position 1204. In some cases, second position 1204 may be disposed adjacent to inboard end 1011 of stem portion 1024. In an exemplary embodiment, the intersection of first contact angle A1 and second contact angle A2 with central axis 1090 may be selected to more evenly distribute forces over wheel assembly 1000.

Figure 8:
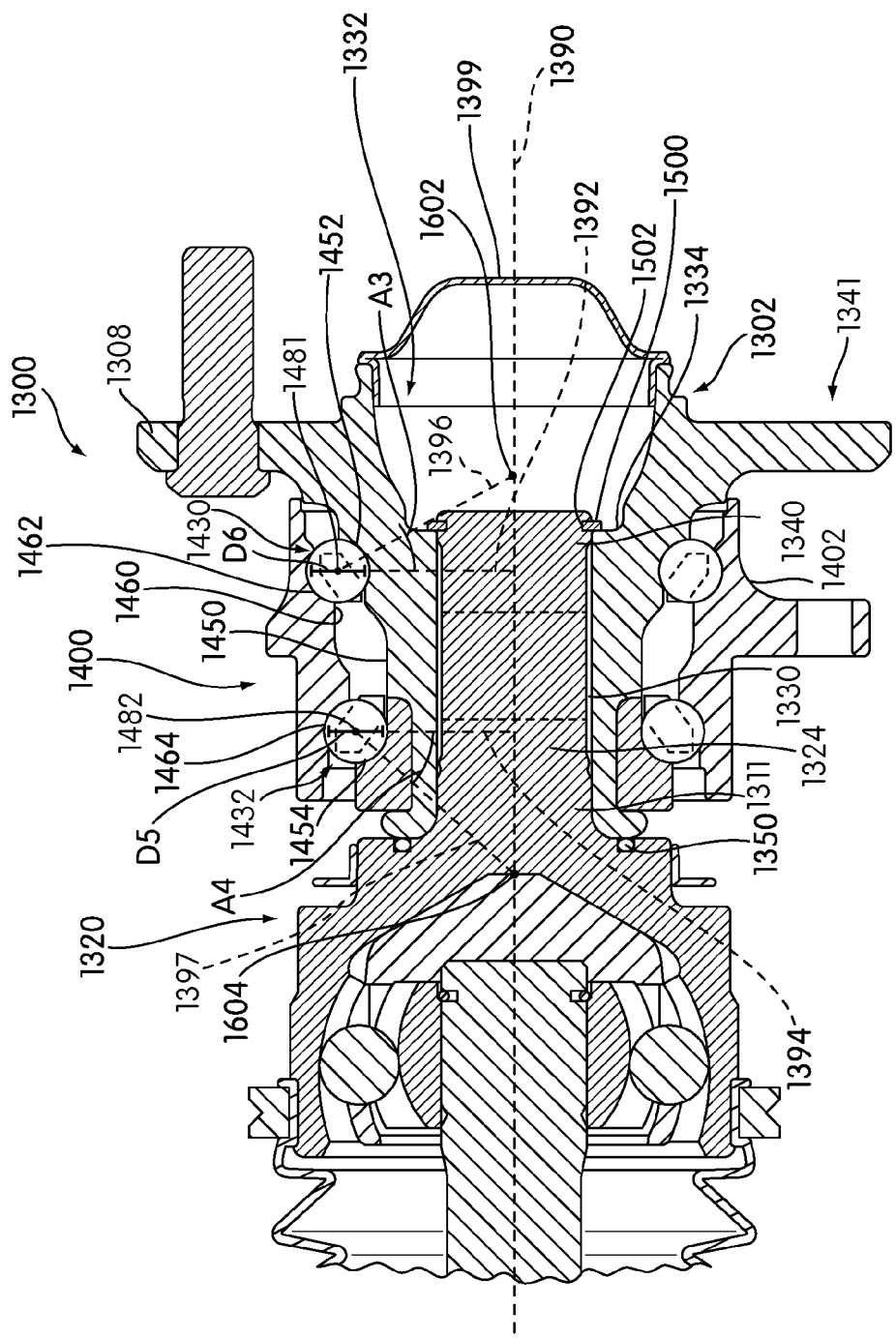
FIG. 8 is a cross sectional view of another embodiment of a portion of a wheel assembly for a motor vehicle.

FIG. 8 illustrates another embodiment of wheel assembly 1300 for a motor vehicle. Referring to FIG. 8, wheel assembly 1300 may comprise similar features to wheel assembly 1000 described above. In particular, wheel assembly 1300 may comprise hub member 1302, driveshaft member 1320 and bearing assembly 1400. Hub member 1302 may be substantially similar to hub member 1302 of the previous embodiment. Additionally, hub member 1302 may include outboard flange portion 1308 at outboard end 1341 of hub member 1302.

Driveshaft member 1320 may comprise joint portion 1322 and stem portion 1324. In some cases, stem portion 1324 may be configured to insert through central hole 1330 of hub member 1302. In one embodiment, outboard end 1340 of stem portion 1324 may also extend into a portion of outer cavity 1332 of hub member 1302. In other cases, however, outboard end 1340 may not extend outside of central hole 1330.

Wheel assembly 1300 can include provisions for securing stem portion 1324 in place with respect to hub portion 1302. In this exemplary embodiment, wheel assembly 1300 can be provided with fastener 1500 for securing stem portion 1324 in place in an axial direction. Generally, fastener 1500 can be any type of fastener. In some cases, fastener 1500 can be a retaining ring of some kind. In other cases, fastener 1500 can be a clip. In an exemplary embodiment, fastener 1500 can be a circlip that has a generally circular geometry.

In an exemplary embodiment, fastener 1500 may be configured to wrap around outboard end 1340 of stem portion 1324. In some cases, fastener 1500 may engage groove 1502 of stem portion 1324. In addition, fastener 1500 may have a diameter that is substantially larger than a diameter of central hole 1330. Moreover, fastener 1500 may be configured to abut a portion of interior wall 1334 of outer cavity 1332. With this arrangement, fastener 1500 may prevent stem portion 1324 from moving in an axially inboard direction.

In some embodiments, wheel assembly 1300 can also include o-ring 1350 that is substantially similar to o-ring 650 of the previous embodiment. In other embodiments, however, o-ring 1350 could be optional. In addition, in some cases, wheel assembly 1300 could include outboard hubcap 1399 that is substantially similar to outboard hub cap 690 of the previous embodiment. In other cases, however, outboard hub cap 1399 could be optional.

In some embodiments, bearing assembly 1400 may be disposed around hub member 1302 in a circumferential manner. Bearing assembly 1400 may comprise outboard bearing row 1430 and inboard bearing row 1432 that are disposed between hub member 1302 and outer member 1402. In one embodiment, bearing assembly 1400 may comprise a substantially similar asymmetric bearing configuration to bearing assembly 300 discussed above. In particular, in one embodiment, outboard bearing row 1430 may be disposed radially further from a central axis of hub member 1302 than inboard bearing row 1432.

Generally, the diameters of one or more bearings associated with bearing assembly 1400 may vary. In some cases, bearings associated with an inboard row could have substantially similar diameters to bearings associated with an outboard row. In other cases, bearings associated with an outboard row could have larger diameters than bearings associated with an inboard row. In still other cases, bearing associated with an outboard row could have smaller diameters than bearing associated with an inboard row.

In the current embodiment, inboard bearing row 1432 may be associated with bearings having diameter D5. In addition, outboard bearing row 1430 may be associated with bearings having diameter D6. In an exemplary embodiment, diameter D5 may be substantially equal to diameter D6. In other words, the bearings associated with inboard bearing row 1432 and outboard bearing row 1430 may have substantially similar sizes. In some cases, diameter D5 and diameter D6 may have values in the range between 8 mm and 15 mm. In an exemplary embodiment, diameter D5 and diameter D6 may both have values of approximately 11 mm.

A wheel assembly can include provisions for evenly distributing the forces applied by a bearing assembly. In some cases, the contact angles associated with a bearing assembly can be selected to achieve an optimum force distribution over the wheel assembly.

For purposes of discussing contact angles, wheel assembly 1300 may be associated with central axis 1390. Moreover, first center line axis 1392 is an axis extending from first bearing center line 1481 of outboard bearing row 1430 to central axis 1390. In particular, first center line axis 1392 is substantially perpendicular to central axis 1390. Also, second center line axis 1394 is an axis extending from second bearing center line 1482 of inboard bearing row 1432 to central axis 1390. In particular, second center line axis 1394 is substantially perpendicular to central axis 1390.

In one embodiment, first portion 1452 of inner raceway surface 1450 may form first contact angle A3 with respect to first center line axis 1392. In other words, contact angle A3 is the angle formed between first center line axis 1392 and first contact axis 1396, which is an axis normal to first portion 1452. Furthermore, first contact angle A3 may intersect central axis 1390 at first position 1602. In other words, first contact axis 1396, which is angled with respect to first center line axis 1392 by contact angle A3, may intersect central axis 1390 at first position 1602. In this case, first position 1602 is disposed between outboard flange portion 1308 and outboard end 1340 of stem portion 1324 in the axial direction. In some cases, first position 1602 may be disposed closer to outboard flange portion 1308 than outboard end 1340 of stem portion 1324. In other cases, first position 1602 may be approximately aligned with outboard flange portion 1308. In a similar manner, second portion 1454 of inner raceway surface 1450 may form second contact angle A4 with respect to second center line axis 1394. In other words, contact angle A4 is the angle formed between second center line axis 1394 and second contact axis 1397, which is an axis normal to second portion 1454. Furthermore, second contact angle A4 may intersect central axis 1390 at second position 1604. In some cases, second position 1604 may be disposed adjacent to inboard end 1311 of stem portion 1324. In an exemplary embodiment, first contact angle A3 and second contact angle A4 may be selected to more evenly distribute forces over wheel assembly 1300.

In some embodiments, a contact angle could be used to define the end of the outboard end of a stem portion. In other words, the contact angle may intersect a central axis at the outboard end of the stem portion, rather than between the end of the stem portion and a flange portion. In other cases, the contact angle could intersect a central axis just outboard of the outboard end of the stem portion. This arrangement may help distribute forces more evenly over a wheel assembly.

A wheel assembly can include provisions for reducing drag. In some embodiments, this can be achieved by configuring a fastener for a drivestem so that the fastener only contributes to preloading of inboard bearings, rather than applying clampload across both inboard and outboard bearings. In some embodiments, this may be achieved by using a shortened drivestem so that the fastener applies a force to a hub at a location that is inboard of an outboard bearing row.

FIGS. 9 through 12 illustrate another embodiment of a wheel assembly, in which a drivestem is significantly shorter than the drivestem discussed in the previous embodiments. It will be understood that some features of the previous embodiments may be included in the embodiment shown in FIGS. 9-12, even if these features are not explicitly discussed.

Figure 9:
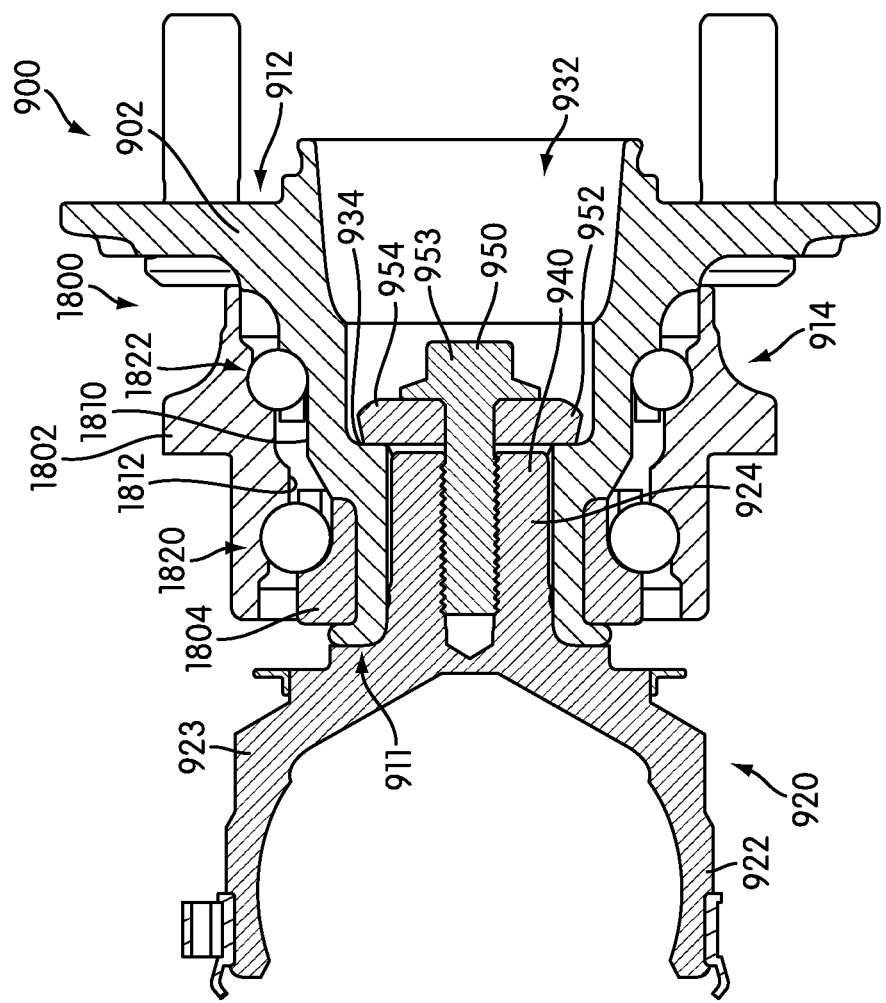
FIG. 9 is a cross sectional view of another embodiment of a portion of a wheel assembly for a motor vehicle.
Figure 10:
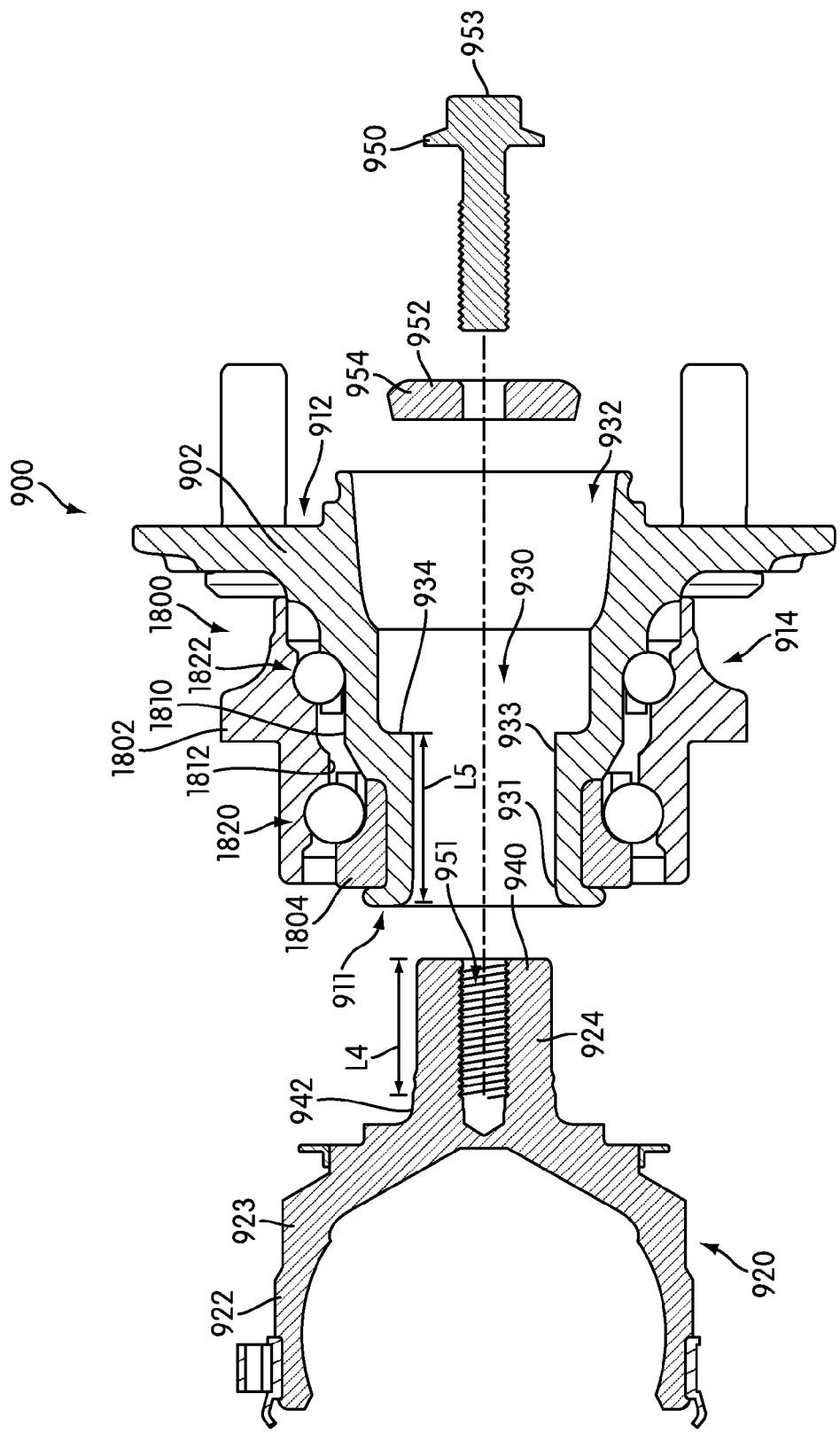
FIG. 10 is a cross sectional exploded view of the portion of the wheel assembly of FIG. 9.

FIGS. 9 and 10 illustrate an embodiment a wheel assembly 900 including hub member 902, driveshaft 920 and bearing assembly 1800. In particular, FIG. 9 illustrates an assembled view of an embodiment of hub member 902 and driveshaft 920, while FIG. 10 illustrates an exploded view of an embodiment of hub member 902 and driveshaft 920. Referring to FIGS. 9 and 10, in some embodiments, hub member 902 may be configured with inboard end 911, outboard end 912 and intermediate portion 914 disposed between inboard end 911 and outboard end 912. Hub member 902 may further include central hole 930 that extends from inboard end 911 to intermediate portion 914. Also, hub member 902 can include outer cavity 932 that extends from intermediate portion 914 to outboard end 912.

In some cases, driveshaft member 920 may comprise joint portion 922 and stem portion 924 that extends from joint portion 922. Joint portion 922 may be any type of joint configured to transmit rotational power. As an example, in some embodiments, joint portion 922 may be associated with a constant velocity joint. In other embodiments, however, other types of joints could be used. In some cases, stem portion 924 may have an approximately cylindrical shape and may extend in an outboard direction from joint portion 922. In other cases, stem portion 924 could have any other shape.

As discussed above, in some embodiments, driveshaft member 920 may be mounted to hub member 902. In some cases, central hole 930 may be configured to receive stem portion 924 of driveshaft member 920. In one embodiment, central hole 930 may be configured with a substantially cylindrical shape that is configured to receive stem portion 924. In an exemplary embodiment, central hole 930 may be configured with a diameter that is large enough to accommodate stem portion 924.

Wheel assembly 900 can include provisions for preventing rotational movement between stem portion 924 and hub portion 902. In some cases, stem portion 924 and central hole 930 can be provided with corresponding interlocking splines that help reduce rotational slip. In other cases, stem portion 924 and central hole 930 can be provided with other features for reducing rotational slip. As an example, in another embodiment a helix interference serration can be applied on stem portion 924 and/or central hole 930 for purposes of reducing rotational slip.

Wheel assembly 900 can include provisions for preventing axial movement between stem portion 924 and central hole 930. Generally, any type of fastener may be used for securing stem portion 924 within central hole 930. In some embodiments, stem portion 924 can include a threaded end portion that is configured to receive a spindle nut. In other embodiments, stem portion 924 can be configured to receive a bolt and a fastening member that help to secure stem portion 924 in place with respect to hub member 902. In still other embodiments, stem portion 924 can be configured to receive a retaining ring of some kind that helps to prevent axial movement with respect to hub member 902.

In one embodiment, outboard end 940 of stem portion 924 may be configured to receive bolt 950. In some cases, outboard end 940 may be provided with threaded cavity 951 that is configured to receive bolt 950. In addition, in some embodiments, fastening member 952 may be secured between bolt head 953 and outboard end 940. In some cases, fastening member 952 may be an annular member with an outer diameter that is substantially larger than the diameter of central hole 930. In particular, outer periphery 954 of fastening member 952 may abut interior wall 934 of outer cavity 932 of hub member 902. With this arrangement, stem portion 924 may be prevented from moving in an axial inboard direction through central hole 930. It will also be understood that in some embodiments, shoulder portion 923 of joint portion 922 may abut inboard end 911 of hub member 902 to prevent stem portion 924 from moving in an axial outboard direction through central hole 930. In other words, shoulder portion 923 and fastening member 952 help to secure stem portion 924 in a substantially constant axial position with respect to hub portion 902. In some cases, fastening member 952 and bolt 950 may not be separate pieces, but may be integrated as a single piece. In other words, in some cases, fastening member 952 may be a flange-like portion of bolt 950 that helps to prevent stem portion 925 from moving in an inboard direction.

As previously discussed, wheel assembly 900 can include bearing assembly 1800. In some embodiments, bearing assembly 1800 can be associated with a portion of hub member 902 as well as outer member 1802 that is disposed radially outwards of hub member 902. In some cases, bearing assembly 1800 may comprise inner raceway surface 1810 that is formed on hub member 902. Bearing assembly 1800 may also comprise outer raceway surface 1812 that is formed on outer member 1802.

Bearing assembly 1800 may be associated with one or more bearing rows. The term "bearing row" refers to a passage between hub member 902 and outer member 1802 through which one or more bearings can pass. A bearing row may have a cross-sectional shape that is configured to receive bearings of a predetermined shape and size. In some cases, bearing assembly 1800 can include one bearing row. In other cases, bearing assembly 1800 can include two bearing rows. In still other cases, bearing assembly 1800 can include more than two bearing rows. In an exemplary embodiment, bearing assembly 1800 can include inboard bearing row 1820 and outboard bearing row 1822.

Generally, any type of bearing may be used with bearing assembly 1800. In some cases, roller bearings may be used. In other cases, ball bearings can be used. In still other cases, roller bearings may be used for some bearing rows while ball bearings may be used for other bearing rows. In an exemplary embodiment, inboard bearing row 1820 and outboard bearing row 1822 may both be associated with ball bearings.

In some embodiments, bearing assembly 1800 can further comprise an inner ring that is separate from hub member 902 and outer member 1802. For example, the current embodiment includes inner ring 1804 that is disposed on a portion of hub member 902 adjacent to inboard end 911. In this case, bearings disposed within inboard bearing row 1820 may be disposed between a radially inner surface of outer member 1802 and a radially outer surface of inner ring 1804. In contrast, bearings disposed within outboard bearing row 1822 may be disposed between a radially inner surface of outer member 1802 and a radially outer surface of hub member 902. With this arrangement, inner ring 1804 may help support bearings of inboard bearing row 1820.

In some embodiments, bearing assembly 1800 may have an approximately symmetric shape, such that inboard bearing row 1820 and outboard bearing row 1822 are approximately a similar distance from a central axis of wheel assembly 900. In other embodiments, bearing assembly 1800 may have an approximately asymmetric shape, similar to bearing assembly 300 discussed above, in which outboard bearing row 1822 is disposed radially further from a central axis of wheel assembly 900 than inboard bearing row 1820. Moreover, in some cases, the sizes of bearings in each bearing row could be substantially similar. In other cases, however, the sizes of bearings in each row could be substantially different. In one embodiment, bearing assembly 1800 has an approximately asymmetric configuration such that outboard bearing row 1822 is disposed radially further from a central axis than inboard bearing row 1820. Furthermore, in one embodiment, the size or diameter of outboard bearing row 1822 is substantially smaller than the size of diameter of inboard bearing row 1820. This asymmetric configuration for bearing assembly 1800 can help in reducing weight for wheel assembly 900. In other embodiments, the sizes or diameters of outboard bearing row 1822 and inboard bearing row 1820 could be substantially similar.

In some embodiments, wheel assembly 900 can be configured so that stem portion 924 is fastened to hub member 902 at a location that is inboard of outboard bearing row 1822. This can be achieved by using a shortened stem portion and by configuring hub member 902 so that a fastener attached to the stem portion applies a clamping force inboard of the outboard bearing row 1822.

In the current embodiment, stem portion 924 may be associated with an axial length L4 (see FIG. 10). Also, central hole 230 may be associated with an axial length L5. In some cases, axial length L4 may be substantially greater than axial length L5. In other cases, axial length L5 may be substantially greater than axial length L4. In one exemplary embodiment, axial length L4 may be substantially equal to axial length L5. In other words, inboard end 942 of stem portion 924 may be generally aligned in the axial direction with inboard end 931 of central hole 930. Likewise, outboard end 940 of stem portion 924 may be generally aligned in the axial direction with outboard end 933 of central hole 930.

Figure 11:
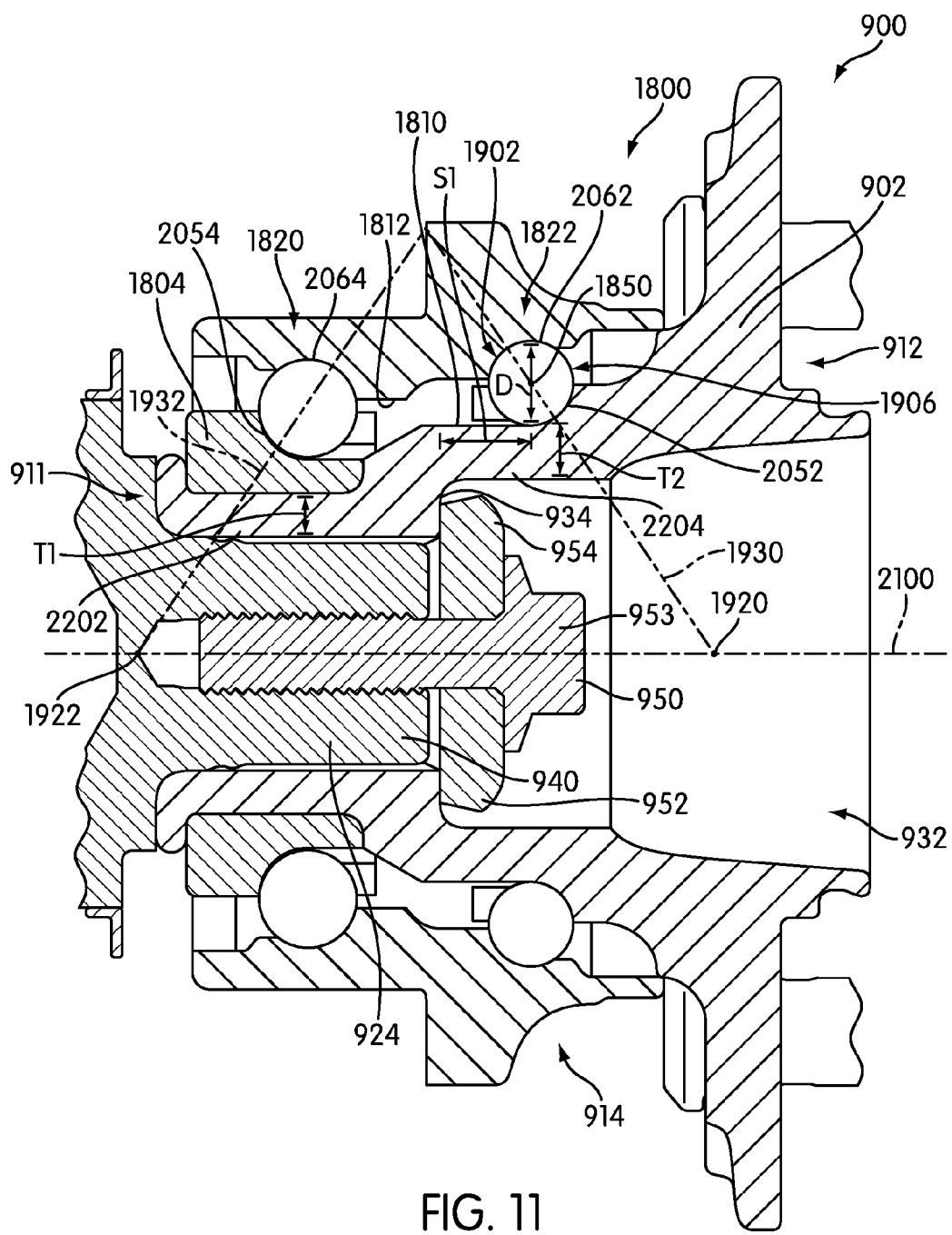
FIG. 11 is an enlarged cross sectional view of the portion of the wheel assembly of FIG. 9.

FIG. 11 illustrates an enlarged view of a portion of wheel assembly 900. Referring to FIG. 11, in order for fastening member 952 to apply a clamping force inwards of outboard bearing row 1822, central cavity 932 may be configured such that interior wall 934 is disposed inboard of outboard bearing row 1822. Then, as fastener 950 is applied to stem portion 924, fastening member 952 applies a clamping load at interior wall 934, and therefore inboard of outboard bearing row 1822. In other words, with this configuration, fastening member 952 does not apply any preloading force to outboard bearing row 1822, which can help reduce drag.

Generally, the location where fastener 950 and fastening member 952 apply a clamping load can vary and generally depends on the location of contact between fastening member 952 and interior wall 934. In some embodiments, fastening member 952 may contact interior wall 934 at a location that is inwards of interior edge 1902 of outboard bearing row 1822. In other embodiments, fastening member 952 may contact interior wall 934 at a location that is inwards of central portion 1850 of outboard bearing row 1822. In still other embodiments, fastening member 952 may contact interior wall 934 at a location that is inwards of outward edge 1906 of outboard bearing row 1822. Moreover, in each of these configurations, the relative location of interior wall 934 can be varied by changing the depth of cavity portion 932. Likewise, in some cases, the length of stem portion 924 can be varied so that outboard end 940 of stem portion 924 is disposed adjacent to fastening member 952, so that stem portion 924 can receive fastener 950.

In one embodiment, interior wall 934 is disposed inwardly of central portion 1850 of outboard bearing row 1822 by a spacing S1. In different embodiments, the value of spacing S1 can vary. For example, in some cases, spacing S1 may be greater than a diameter D that characterizes the size of outboard bearing row 1822. In other cases, spacing S1 may be greater than a radial size of outboard bearing row 1822, which is one half of diameter D. However, these ranges are only exemplary and in other embodiments spacing S1 could have any value.

In other embodiments, the sizes of stem portion 924 and central hole 930 can be varied in any manner so that interior wall 934 (and thus the location where fastening member 952 applies a clamping load) is disposed inwardly of outboard bearing row 1822 and outboard of inboard bearing row 1820. This allows for a configuration where there is no preloading applied to outboard bearing row 1822, but some preloading applied to inboard bearing row 1824. This overall configuration helps to reduce drag in wheel assembly 900.

It should be understood that while the location where fastener 950 and fastening member 952 apply a clamping force to hub member 902 may be inboard of outboard bearing row 1822, fastener 950 and/or fastening member 952 could extend outwards of outboard bearing row 1822. In particular, depending on the thickness of fastening member 952 and fastener 950, both fastening member 952 and fastener 950 may extend outwardly from interior wall 934, where the clamping force is applied. However, in such configurations it is understood that the force is still applied inwards of outer bearing row 1822, and therefore fastener 950 and fastening member 952 do not contribute to preloading of outboard bearing row 1822.

In some embodiments, the location where stem portion 924 is attached to hub member 902 may be disposed inwardly of on outboard contact point. For purposes of understanding the locations of contact points, various portions of bearing assembly 1800 are described in further detail. Bearing assembly 1800 can include inner raceway surface 1810, as previously discussed. Inner raceway surface 1810 may further include first portion 2052 and second portion 2054 associated with outboard bearing row 1822 and inboard bearing row 1820, respectively. Bearing assembly 1800 can also include outer raceway surface 1812. Outer raceway surface 1812 may further include first portion 2062 and second portion 2064 associated with outboard bearing row 1820 and inboard bearing row 1822. In other words, bearings in outboard bearing row 1822 may be in contact with first portion 2052 of inner raceway surface 1810 and first portion 2062 of outer raceway surface 1812. Likewise, bearings in inboard bearing row 1820 may be in contact with second portion 2054 of inner raceway surface 1810 and second portion 2064 of outer raceway surface 1812.

In some embodiments, wheel assembly 900 may be associated with outboard contact point 1920 and inboard contact point 1922. Outboard contact point 1920 is a point in which a first axis 1930, which is perpendicular to first portion 2052 of inner raceway surface 1810, intersects central axis 2100 of hub member 902. Inboard contact point 1922 is a point where second axis 1932, which is perpendicular to second portion 2054 of inner raceway surface 1810, intersects central axis 2100.

In some embodiments, stem portion 924, fastening member 952 and fastener 950 may be disposed inwardly of outboard contact point 1920. In other embodiments, fastener 950 and/or fastening member 952 may be approximately aligned with outboard contact point 1920. Moreover, in some embodiments, outboard portion 940 of stem portion 924 may be disposed approximately midway between outboard contact point 1920 and inboard contact point 1922. By varying the location where a clamping load is applied to hub member 902 between inboard contact point 1922 and outboard contact point 1920, the axial loading of wheel assembly 900 can be varied.

In some embodiments, a hub member can include an approximately constant cross-sectional thickness in regions associated with a bearing assembly. For example, in the current embodiment, hub member 902 includes first stepped portion 2202 that is adjacent to inboard bearing row 1820 and second stepped portion 2204 that is adjacent to outboard bearing row 1822. In some embodiments, first stepped portion 2202 may be associated with first thickness T1 and second stepped portion 2204 may be associated with second thickness T2. In some cases, first thickness T1 may be substantially greater than second thickness T2. In other cases, first thickness T1 may be substantially less than second thickness T2. In one embodiment, first thickness T1 may be approximately equal to second thickness T2. By maintaining an approximately constant cross-sectional thickness for hub member 902, the weight of hub member 902 can be reduced while maintaining strength for hub member 902.

Figure 12:
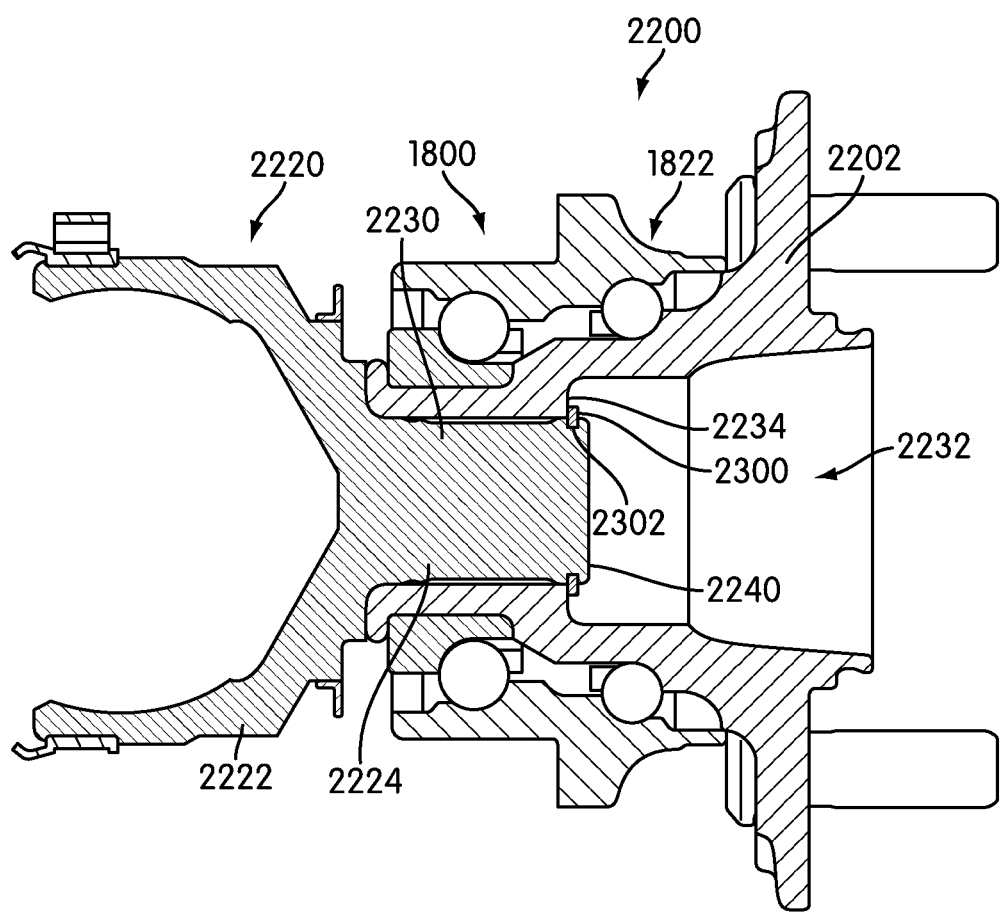
FIG. 12 is a cross sectional view of another embodiment of a portion of a wheel assembly for a motor vehicle.

FIG. 12 illustrates another embodiment of wheel assembly 2200 for a motor vehicle. For purposes of clarity, like numerals are used for similar parts. Referring to FIG. 12, wheel assembly 2200 may comprise similar features to wheel assembly 900 described above. In particular, wheel assembly 2200 may comprise hub member 2202, driveshaft member 2220 and bearing assembly 1800. Hub member 2202 may be substantially similar to hub member 902 of the previous embodiment.

Driveshaft member 2220 may comprise joint portion 2222 and stem portion 2224. In some cases, stem portion 2224 may be configured to insert through central hole 2230 of hub member 2202. In one embodiment, outboard end 2240 of stem portion 2224 may also extend into a portion of outer cavity 2232 of hub member 2202. In other cases, however, outboard end 2240 may not extend outside of central hole 2230.

Wheel assembly 2200 can include provisions for securing stem portion 2224 in place with respect to hub portion 2202. In this exemplary embodiment, wheel assembly 2200 can be provided with fastener 2300 for securing stem portion 2224 in place in an axial direction. Generally, fastener 2300 can be any type of fastener. In some cases, fastener 2300 can be a retaining ring of some kind. In other cases, fastener 2300 can be a clip. In an exemplary embodiment, fastener 2300 can be a circlip that has a generally circular geometry.

In an exemplary embodiment, fastener 2300 may be configured to wrap around outboard end 2240 of stem portion 2224. In some cases, fastener 2300 may engage groove 2302 of stem portion 2224. In addition, fastener 2300 may have a diameter that is substantially larger than a diameter of central hole 2230. Moreover, fastener 2300 may be configured to abut a portion of interior wall 2234 of outer cavity 2232. With this arrangement, fastener 2300 may prevent stem portion 2224 from moving in an axially inboard direction.

As with the previous embodiment, in this case interior wall 2234 is disposed inwardly of outer bearing row 1822 of bearing assembly 1800. Moreover, fastener 2300 may contact interior wall 2234, and apply a load to interior wall 2234, inwardly of outboard bearing row 1822. Using this arrangement, fastener 2300 may apply preloading to inboard bearing row 1820, but not outboard bearing row 1822. It will be understood that the location where fastener 2300 engages hub 2202 can be varied in a similar manner to the embodiment discussed above. In particular, the location where fastener 2300 applies a force to hub 2202 can be disposed at any point between inboard bearing row 1820 and outboard bearing row 1822. This can be achieved by varying the sizes of stem portion 2224, central hole 2230 and cavity 2232.

While various embodiments have been described, the description is intended to be exemplary, rather than limiting and it will be apparent to those of ordinary skill in the art that many more embodiments and implementations are possible. Accordingly, the embodiments are not to be restricted except in light of the attached claims and their equivalents. Also, various modifications and changes may be made within the scope of the attached claims.

What is claimed is:

1. A wheel assembly for a motor vehicle, comprising:
   an axial direction including an axial outboard direction that is oriented towards an outer side of the motor vehicle along a central axis of a wheel of the wheel assembly and the axial direction further including an axial inboard direction that is oriented towards a longitudinal centerline of the motor vehicle along the central axis of the wheel;
   a hub member for mounting the wheel to the motor vehicle, the hub member comprising a central hole and an outboard flange portion;
   a driveshaft including a stem portion, the stem portion being configured to insert into the central hole;
   a bearing assembly comprising an outboard bearing row and an inboard bearing row, the inboard bearing row being disposed axially inboard of the outboard bearing row;
   the outboard bearing row being disposed radially further from a central axis of the hub member than the inboard bearing row;
   the outboard bearing row having a first diameter and the inboard bearing row having a second diameter;
   wherein the first diameter is smaller than the second diameter;
   wherein the bearing assembly includes an inner raceway surface and an outer raceway surface and wherein the inner raceway surface includes a first portion associated with the outboard bearing row and wherein the inner raceway surface includes a second portion associated with the inboard bearing row; and
   wherein a contact angle formed with the first portion intersects the central axis of the hub member at a position that is between an inboard face of the outboard flange portion and an axially outboard end of the stem portion.

2. The wheel assembly according to claim 1, wherein the central hole is configured to receive the stem portion of the driveshaft and wherein the axially outboard end of the stem portion is approximately aligned with the outboard bearing row in the axial direction.

3. The wheel assembly according to claim 2, wherein the outboard end of the stem portion is configured to receive a bolt, the bolt being used to attach a fastening member to the outboard end of the stem portion and wherein the fastening member is configured to abut an interior wall of the hub member and thereby prevent the stem portion from moving in the axial direction with respect to the hub member.

4. The wheel assembly according to claim 3, wherein the fastening member has a diameter that is larger than a diameter of the central hole.

5. The wheel assembly according to claim 4, wherein the fastening member has an annular shape.

6. The wheel assembly according to claim 2, wherein the outboard end of the stem portion is configured to receive a clip for preventing the stem portion from moving in the axial direction with respect to the hub member.

7. The wheel assembly according to claim 6, wherein the clip is a circlip.

8. The wheel assembly according to claim 7, wherein the outboard end of the stem portion includes a groove for receiving the circlip.

9. The wheel assembly according to claim 8, wherein the circlip has a diameter that is larger than a diameter of the central hole.

10. The wheel assembly according to claim 2, wherein the outboard bearing row is disposed between an outer member of the bearing assembly and the hub member.

11. The wheel assembly according to claim 10, wherein the inboard bearing row is disposed between the outer member and an inner ring.

12. The wheel assembly according to claim 11, wherein the inner ring is disposed on the hub member.

13. The wheel assembly according to claim 2, wherein the outboard end of the stem portion is aligned in the axial direction with an outboard end of the bearing assembly and wherein an inboard end of the stem portion is aligned in the axial direction with an inboard end of the bearing assembly.

14. The wheel assembly according to claim 13, wherein the outboard end of the stem portion is configured to receive a bolt, the bolt being used to attach a fastening member to the outboard end of the stem portion and wherein the fastening member is configured to abut an interior wall of the hub member and thereby prevent the stem portion from moving in the axial direction with respect to the hub member.

15. The wheel assembly according to claim 14, wherein the fastening member is approximately aligned with the outboard end of the bearing assembly.

16. The wheel assembly according to claim 13, wherein a circlip is disposed on the outboard end of the stem portion and wherein the circlip is configured to abut an interior wall of an outer cavity, the outer cavity being disposed outboard of the central hole.

17. The wheel assembly according to claim 16, wherein an o-ring is disposed between a swaged portion and a shoulder portion of the driveshaft.

18. The wheel assembly according to claim 13, wherein the hub member includes a swaged portion.

19. A wheel assembly for a motor vehicle, comprising:
an axial direction including an axial outboard direction that is oriented towards an outer side of the motor vehicle along a central axis of a wheel of the wheel assembly and the axial direction further including an axial inboard direction that is oriented towards a longitudinal centerline of the motor vehicle along the central axis of the wheel;
a hub member for mounting the wheel to the motor vehicle, the hub member comprising a central hole and an outboard flange portion;
a driveshaft including a stem portion, the stem portion being configured to insert into the central hole;
a bearing assembly comprising an outboard bearing row and an inboard bearing row, the inboard bearing row being disposed axially inboard of the outboard bearing row;
the outboard bearing row being disposed radially further from a central axis of the hub member than the inboard bearing row;
wherein an outboard end of the stem portion is generally aligned in the axial direction with the outboard bearing row;
wherein the bearing assembly includes an inner raceway surface and an outer raceway surface and wherein the inner raceway surface includes a first portion associated with the outboard bearing row and wherein the inner raceway surface includes a second portion associated with the inboard bearing row; and
wherein a contact angle formed with the first portion intersects the central axis of the hub member at a position that is between an inboard face of the outboard flange portion of the hub member and the outboard end of the stem portion.

20. The wheel assembly according to claim 19, wherein the position is disposed closer to the inboard face of the outboard flange portion than the stem portion.

21. The wheel assembly according to claim 20, wherein the position is aligned in the axial direction with the outboard end of the stem portion.

22. The wheel assembly according to claim 20, wherein the outboard bearing row and the inboard bearing row have bearings of equal diameter.

23. A wheel assembly for a motor vehicle, comprising:
an axial direction including an axial outboard direction that is oriented towards an outer side of the motor vehicle along a central axis of a wheel of the wheel assembly and the axial direction further including an axial inboard direction that is oriented towards a longitudinal centerline of the motor vehicle along the central axis of the wheel;
a hub member for mounting the wheel to the motor vehicle, the hub member comprising a central hole and an outboard flange portion;
a driveshaft including a stem portion, the stem portion being configured to insert into the central hole;
a bearing assembly comprising an outboard bearing row and an inboard bearing row, the inboard bearing row being disposed axially inboard of the outboard bearing row;
the outboard bearing row being disposed radially further from a central axis of the hub member than the inboard bearing row;
wherein an outboard end of the stem portion approximately corresponds to an outboard end of the bearing assembly and wherein an inboard end of the stem portion approximately corresponds to an inboard end of the bearing assembly;
wherein the bearing assembly includes an inner raceway surface and an outer raceway surface and wherein the inner raceway surface includes a first portion associated with the outboard bearing row and wherein the inner raceway surface includes a second portion associated with the inboard bearing row; and
wherein a contact angle formed with the first portion intersects the central axis of the hub member at a position that is between an inboard face of the outboard flange portion and the outboard end of the stem portion.

24. The wheel assembly according to claim 23, wherein the stem portion and the central hole include interlocking splines.

25. The wheel assembly according to claim 23, wherein the outboard end of the stem portion is configured to receive a bolt, the bolt being used to attach a fastening member to the outboard end of the stem portion and wherein the fastening member is configured to abut an interior wall of the hub member and thereby prevent the stem portion from moving in the axial direction with respect to the hub member.

26. The wheel assembly according to claim 25, wherein the fastening member has a diameter that is larger than a diameter of the central hole.

27. The wheel assembly according to claim 26, wherein the fastening member has an annular shape.

28. The wheel assembly according to claim 23, wherein the outboard end of the stem portion is configured to receive a clip for preventing the stem portion from moving in the axial direction with respect to the hub member.

29. The wheel assembly according to claim 28, wherein the clip is a circlip.

30. The wheel assembly according to claim 29, wherein the outboard end of the stem portion includes a groove for receiving the circlip.

31. The wheel assembly according to claim 30, wherein the circlip has a diameter that is larger than a diameter of the central hole.

32. A wheel assembly for a motor vehicle, comprising:
an axial direction including an axial outboard direction that is oriented towards an outer side of the motor vehicle along a central axis of a wheel of the wheel assembly and the axial direction further including an axial inboard direction that is oriented towards a longitudinal centerline of the motor vehicle along the central axis of the wheel;
a hub member for mounting the wheel to the motor vehicle, the hub member comprising a central hole;
the hub member further comprising an outboard flange portion;
a driveshaft including a stem portion, the stem portion being configured to insert into the central hole;
a bearing assembly comprising an outboard bearing row and an inboard bearing row, the inboard bearing row being disposed axially inboard of the outboard bearing row;
the outboard bearing row being disposed radially further from a central axis of the hub member than the inboard bearing row;
the bearing assembly including an inner raceway surface and an outer raceway surface and wherein the inner raceway surface includes a first portion associated with the outboard bearing row and wherein the inner raceway surface includes a second portion associated with the inboard bearing row; and
wherein a contact angle formed with the first portion intersects the central axis of the hub member at a position that is between an inboard face of the outboard flange portion and an outboard end of the stem portion.

33. The wheel assembly according to claim 32, wherein the position is disposed closer to the inboard face of the outboard flange portion than the outboard end of the stem portion.

34. The wheel assembly according to claim 32, wherein the position is aligned with the outboard end of the stem portion.

35. The wheel assembly according to claim 32, wherein the driveshaft includes a joint portion from which the stem portion extends, wherein the joint portion defines an interior cavity with a wall surface at an outermost position in the axial outboard direction, and wherein a contact angle formed with the second portion intersects the central axis of the hub member at a position that is disposed at the wall surface.

36. A wheel assembly for a motor vehicle, comprising:
an axial direction including an axial outboard direction that is oriented towards an outer side of the motor vehicle along a central axis of a wheel of the wheel assembly and the axial direction further including an axial inboard direction that is oriented towards a longitudinal centerline of the motor vehicle along the central axis of the wheel;
a hub member for mounting the wheel to the motor vehicle, the hub member comprising a central hole;
the hub member further comprising an outboard flange portion;
a driveshaft including a stem portion, the stem portion being configured to insert into the central hole;
a bearing assembly comprising an outboard bearing row and an inboard bearing row, the inboard bearing row being disposed axially inboard of the outboard bearing row;
the outboard bearing row being disposed radially further from a central axis of the hub member than the inboard bearing row;
the bearing assembly including an inner raceway surface and an outer raceway surface and wherein the inner raceway surface includes a first portion associated with the outboard bearing row and wherein the inner raceway surface includes a second portion associated with the inboard bearing row; and
the first portion being associated with a contact angle;
the stem portion comprising an outboard end; and
wherein the contact angle intersects the central axis of the hub member at the outboard end of the stem portion and at a position inboard of an inboard face of the outboard flange portion of the hub member.

37. The wheel assembly according to claim 36, wherein the outboard bearing row has a first diameter and the inboard bearing row has a second diameter and wherein the first diameter is smaller than the second diameter.

38. The wheel assembly according to claim 36, wherein the outboard end of the stem portion is configured to receive a clip for preventing the stem portion from moving in the axial direction with respect to the hub member.

39. The wheel assembly according to claim 36, wherein the outboard end of the stem portion is configured to receive a bolt for preventing the stem portion from moving in the axial direction with respect to the hub member.

40. The wheel assembly according to claim 36, wherein the hub member includes a swaged portion.

41. A wheel assembly for a motor vehicle, comprising:
an axial direction including an axial outboard direction that is oriented towards an outer side of the motor vehicle along a central axis of a wheel of the wheel assembly and the axial direction further including an axial inboard direction that is oriented towards a longitudinal centerline of the motor vehicle along the central axis of the wheel;
a hub member for mounting the wheel to the motor vehicle, the hub member comprising a central hole;
the hub member further comprising an outboard flange portion;
a driveshaft including a stem portion, the stem portion being configured to insert into the central hole;
a bearing assembly comprising an outboard bearing row and an inboard bearing row, the inboard bearing row being disposed axially inboard of the outboard bearing row;
the outboard bearing row being disposed radially further from a central axis of the hub member than the inboard bearing row;
a fastener configured to engage an outboard end of the stem portion;
wherein the fastener applies a force to the hub member at a location inboard of the outboard bearing row;

wherein the bearing assembly includes an inner raceway surface and an outer raceway surface and wherein the inner raceway surface includes a first portion associated with the outboard bearing row and wherein the inner raceway surface includes a second portion associated with the inboard bearing row; and wherein a contact angle formed with the first portion intersects the central axis of the hub member at a position that is between an inboard face of the outboard flange portion and the outboard end of the stem portion.

42. The wheel assembly according to claim 41, wherein the fastener comprises an annular fastening member and a bolt, and wherein the annular fastening member is secured to the outboard end of the stem portion with the bolt.

43. The wheel assembly according to claim 41, wherein the outboard end of the stem portion is disposed inboard of the outboard bearing row.

44. The wheel assembly according to claim 41, wherein the location is inboard of an inboard edge of the outboard bearing row.

45. The wheel assembly according to claim 41, wherein the location is inboard of a central portion of the outboard bearing row.

46. The wheel assembly according to claim 41, wherein the fastener comprises a clip that engages a groove in the outboard end of the stem portion.

47. The wheel assembly according to claim 41, wherein a first portion of the hub member adjacent to the inboard bearing row has a first cross sectional thickness and wherein a second portion of the hub member adjacent to the outboard bearing row has a second thickness that is equal to the first thickness.

\* \* \* \* \*